(12) United States Patent
Tanabe

(10) Patent No.: US 9,979,586 B2
(45) Date of Patent: May 22, 2018

(54) PHASE MODULATION DEVICE AND LASER MICROSCOPE

(71) Applicant: CITIZEN WATCH CO., LTD., Tokyo (JP)

(72) Inventor: Ayano Tanabe, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days. days.

(21) Appl. No.: 15/513,121

(22) PCT Filed: Jun. 22, 2015

(86) PCT No.: PCT/JP2015/067914
§ 371 (c)(1),
(2) Date: Mar. 21, 2017

(87) PCT Pub. No.: WO2016/047225
PCT Pub. Date: Mar. 31, 2016

(65) Prior Publication Data
US 2017/0302498 A1    Oct. 19, 2017

(30) Foreign Application Priority Data
Sep. 25, 2014    (JP) .................. 2014-195399

(51) Int. Cl.
*G02B 21/00*    (2006.01)
*H04L 27/38*    (2006.01)
(Continued)

(52) U.S. Cl.
CPC ........ *H04L 27/389* (2013.01); *G02B 21/0028* (2013.01); *G02B 21/0036* (2013.01);
(Continued)

(58) Field of Classification Search
CPC ............... G02B 26/06; G02B 21/0032; G02B 27/0025; G02B 27/0068; G02B 27/06;
(Continued)

(56) References Cited

U.S. PATENT DOCUMENTS 5,530,590 A    6/1996  Saito
2002/0154398 A1  10/2002  Wolleschensky et al.
(Continued)

FOREIGN PATENT DOCUMENTS

EP    2887132 A1    6/2015
JP    H11-101942 A    4/1999
(Continued)

OTHER PUBLICATIONS

Horsley et al "Charactirization for Vision Science Applications of a Bimorph Deformable Mirror Using Phase-Shifting Interferometry" (2005) , Proceedings of Spie vol. 5688, pp. 133-144.*
(Continued)

*Primary Examiner* — Jean B Corrielus

(57) ABSTRACT

The phase modulation device (3) includes a first phase modulation element (11) which modulates a phase of a light flux in accordance with a voltage applied to each of a plurality of first electrodes in accordance with a first ratio of a second aberration component to a first aberration component of a wave front aberration generated by an optical system including an objective lens (4); a second phase modulation element (12) which modulates a phase of a light flux in accordance with a voltage applied to each of a plurality of second electrodes in accordance with a second ratio of the second aberration component to the first aberration component; and a control circuit (3) which controls voltages applied to each of first electrodes and each of second electrodes in accordance with a distance from the objective lens to a light focusing position of the light flux.

5 Claims, 15 Drawing Sheets

(51) Int. Cl.
*H04L 27/36* (2006.01)
*G02B 21/08* (2006.01)
*H01J 3/14* (2006.01)

(52) U.S. Cl.
CPC ....... *G02B 21/0088* (2013.01); *G02B 21/082* (2013.01); *H01J 3/14* (2013.01); *H04L 27/361* (2013.01); *G02B 21/00* (2013.01)

(58) Field of Classification Search
CPC ............... G02B 21/00; G02B 21/0036; G02B 21/0088; G02B 21/0028; G02B 21/082; H04L 27/389; H04L 27/361; H01J 3/14
See application file for complete search history.

(56) References Cited

U.S. PATENT DOCUMENTS

| | | |
|---|---|---|
| 2003/0002425 A1 | 1/2003 | Yamanoto et al. |
| 2008/0253267 A1 | 10/2008 | Nakai |
| 2011/0134436 A1* | 6/2011 | Podoleanu ............ A61B 3/1015 356/512 |
| 2011/0193269 A1* | 8/2011 | Ito ........................ B23K 26/032 264/400 |
| 2013/0342768 A1 | 12/2013 | Yokoyama et al. |
| 2015/0116812 A1 | 4/2015 | Matsumoto et al. |
| 2015/0338639 A1 | 11/2015 | Matsumoto et al. |

FOREIGN PATENT DOCUMENTS

| | | |
|---|---|---|
| JP | 3299808 B2 | 4/2002 |
| JP | 2003-067966 A | 3/2003 |
| WO | 2005/117003 A1 | 12/2005 |
| WO | 2012/124634 A1 | 9/2012 |
| WO | 2013/115383 A1 | 8/2013 |
| WO | 2013/172085 A1 | 11/2013 |
| WO | 2014/027694 A1 | 2/2014 |

OTHER PUBLICATIONS

International Search Report for PCT/JP2015/067914, dated Sep. 29, 2015.
Written Opinion of the International Searching Authority for PCT/JP2015/067914, dated Sep. 29, 2015.

* cited by examiner

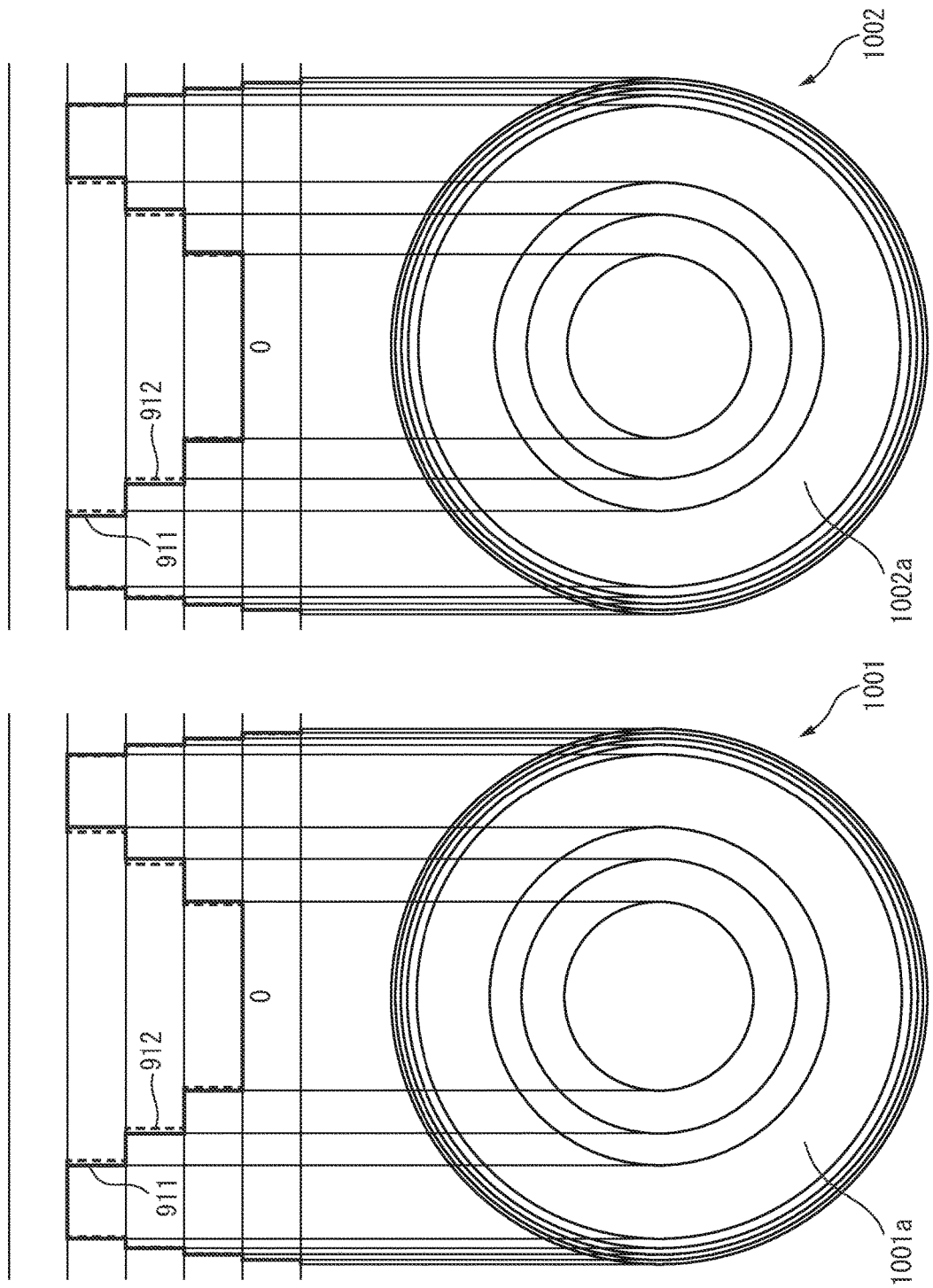

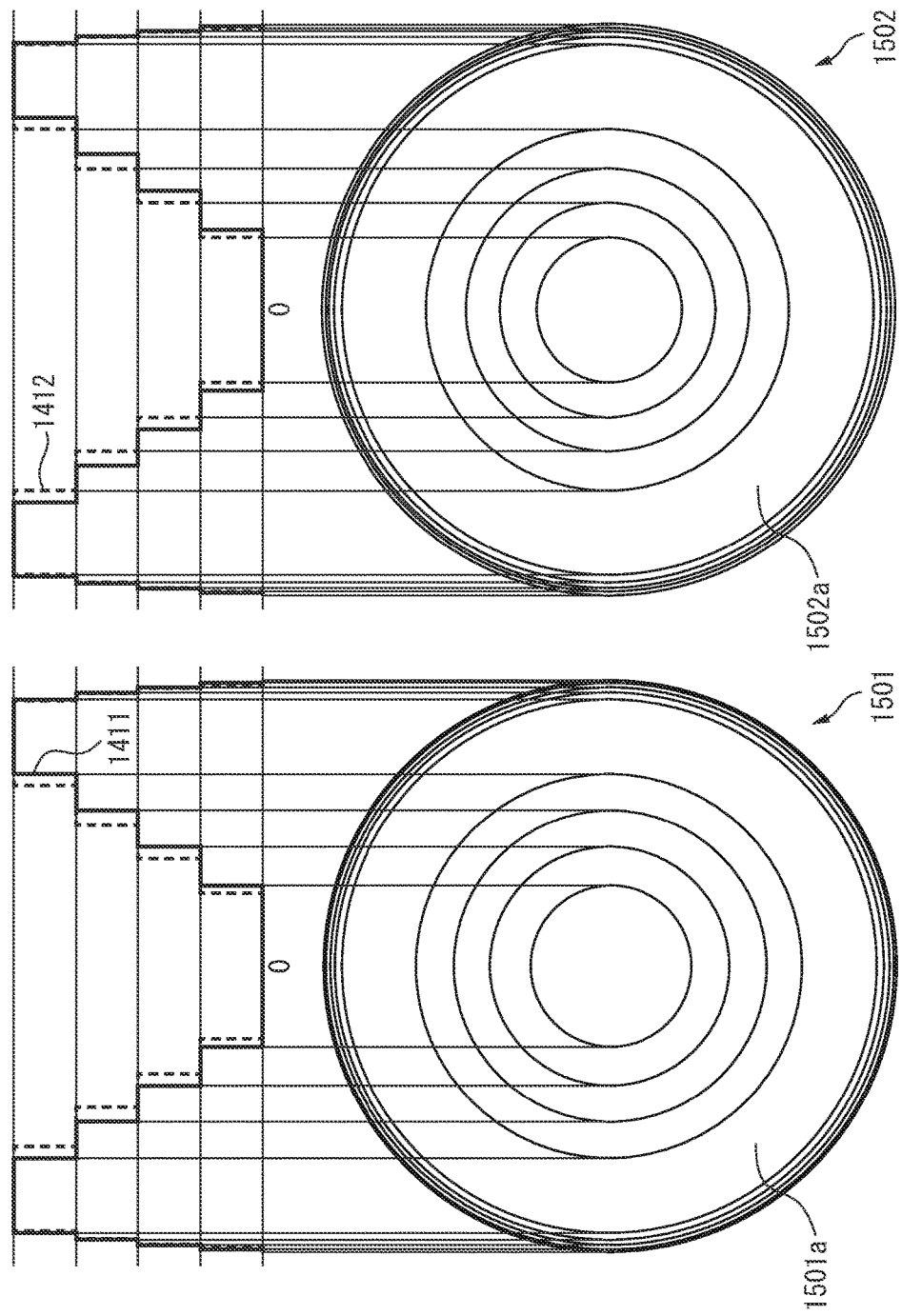

PHASE MODULATION DEVICE AND LASER MICROSCOPE

TECHNICAL FIELD

The invention relates to a phase modulation device for compensating aberrations generated by an optical system used in a microscope or the like and to a laser microscope utilizing such a phase modulation device.

BACKGROUND ART

A confocal laser microscope is configured such that laser light is focused on a specimen through an objective lens, a light flux of reflected light, scattered light, or fluorescent light generated on the specimen is transmitted by an optical system, and the light flux transmitted through a pinhole disposed at an optically conjugated position with respect to a light focusing point on the specimen is received on a detector. Disposing the pinhole makes it possible to filter the light generated on the specimen other than the light focusing point. Therefore, the confocal laser microscope can acquire an image with a good S/N ratio.

Further, the confocal laser microscope is configured to acquire a planar image of a specimen by scanning the specimen with laser light along two directions (X-direction and Y-direction) orthogonal to each other, along a plane perpendicular to the optical axis. On the other hand, the confocal laser microscope is configured to acquire a plurality of tomographic images (Z-stack images) along the Z-direction by changing the distance along the optical axis direction (Z-direction) between the objective lens and the specimen, whereby a three-dimensional image of the specimen is formed.

In observing a biospecimen, it is often the case that the biospecimen is observed through a cover glass in a state in which the biospecimen is immersed in a broth. Further, generally, the objective lens is designed so that an optimum imaging performance at a position immediately below the cover glass is best. In observing the inside of a biospecimen, it is preferable to acquire an image transmitted through a broth or biological tissues and having a certain depth at an observation position. Aberrations are generated in proportion to the distance from the position immediately below the cover glass to the observation position, and as a result, the resolution may be lowered.

Further, the cover glasses have variations in the thickness thereof within the tolerance range from the design value (e.g. 0.17 mm). Aberrations are generated in proportion to a difference between the actual thickness of the cover glass and the design thickness due to a difference between the refractive index ($=1.525$) of the cover glass and the refractive index ($=1.38$ to $1.39$) of the biospecimen. Further, when the objective lens is an immersion lens, aberrations are generated in proportion to the depth of a biospecimen with respect to the observation position due to a difference between the refractive index of the biospecimen and the refractive index ($=1.333$) of water in the same manner as described above. As a result, the resolution to be obtained in observing a deep part of the biospecimen may be lowered.

As one way of solving the above defects, a correction ring has been proposed (e.g., see Patent literature 1). The correction ring is a ring-shaped rotary member provided for an objective lens, and distances between lens groups constituting the objective lens are changed by rotating the correction ring. Aberrations due to an error in the thickness of the cover glass or observing a deep part of the biospecimen are cancelled by rotating the correction ring. A scale is marked on the correction ring. For instance, rough numerical values such as 0, 0.17, and 0.23 are indicated concerning the thickness of the cover glass. Then, adjusting the scale of the correction ring in accordance with a thickness of an actually used cover glass makes it possible to adjust the distances between the lens groups in such a manner as to optimize the distances in accordance with the thickness of the cover glass.

However, the operation of the correction ring is performed by manually rotating a ring-shaped adjustment mechanism provided on the objective lens. Therefore, focus deviation or view field deviation resulting from adjusting the adjustment mechanism may occur. Further, to determine an optimum position of the objective lens, it is preferable to repeat the operation of the correction ring and focusing, resulting in a process for the optimization being cumbersome. Since the process is cumbersome, it takes time to make adjustments in order to obtain an optimum position, and a fluorescent pigment may fade. The fading of the fluorescent pigment is a problem of weakening fluorescent intensity due to continuous emission of excitation light.

Further, the operation of the correction ring may need fine control. Under the present circumstances, judgment on the adjustment result of the focusing by the operation relies on a person who visually observes an image and therefore, it is very difficult to judge whether the objective lens is located at an optimum position. In particular, in photographing images of Z-stack, it is preferable to repeat this operation for the number of images acquired in a depth direction, which is very cumbersome. As a result, under the present circumstances, the number of users who sufficiently utilize the correction ring is small. Further, in some specimens, vibrations resulting from touching may affect the observation position, and in view of the above, it is desirable to automatically adjust the focus without touching the objective lens by hand.

A technique is proposed in which, without the need of touching an objective lens or its frame by hand, a user corrects wave front aberrations generated by an optical system depending on the specimen or observation conditions, by using a phase modulation device which is disposed in the optical system including the objective lens and which displays a phase modulation profile having a polarity opposite to the polarity of a phase distribution, which profile is represented according to a relational equation between a numerical aperture of the objective lens and the ratio of the third-order spherical aberration and the fifth-order spherical aberration given when the phase distribution of the wave front aberrations is resolved using Zernike polynomials (e.g., see Patent literature 2).

CITATIONS LIST

Patent Literature

Patent literature 1: JP 3299808 B2
Patent literature 2: WO2013/115383

SUMMARY OF INVENTION

Technical Problem

However, except for the pupil plane of an objective lens, the ratio between the third-order spherical aberration component and the fifth-order spherical aberration component varies in accordance with a depth of a specimen as an object to be observed, i.e., a distance from the objective lens to the light focusing position of a light flux focused by the objective lens. Accordingly, when restrictions or the like arising from the structure of a microscope do not allow the phase modulation device disclosed in Patent literature 2 to be disposed in either the pupil plane or conjugate plane of the objective lens, the phase modulation device may not properly correct wave front aberrations generated by an optical system including an objective lens when a depth of a specimen as an object to be observed varies.

In view of the above, the invention provides a phase modulation device that can correct aberrations generated by an optical system including an objective lens, even though a distance from the objective lens to the position where a light flux is focused varies.

Solution to Problem

According to an embodiment of the invention, a phase modulation device for correcting wave front aberrations generated by an optical system including an objective lens disposed on an optical path of a light flux of light to be emitted from a light source is provided. This phase modulation device includes a first phase modulation element which includes a plurality of first electrodes disposed to impart to a light flux an amount of phase modulation to cancel a phase distribution in accordance with a first ratio of a second aberration component of a wave front aberration to a first aberration component of the wave front aberration, and modulates a phase of the light flux in accordance with a voltage applied to each of the plurality of first electrodes; a second phase modulation element which includes a plurality of second electrodes disposed to impart to the light flux an amount of phase modulation which cancels a phase distribution in accordance with a second ratio of the second aberration component of the wave front aberration to the first aberration component of the wave front aberration, the second ratio being smaller than the first ratio, and modulates a phase of the light flux in accordance with a voltage applied to each of the plurality of second electrodes; and a control circuit which controls voltages applied to the plurality of first electrodes and voltages applied to the plurality of second electrodes in accordance with an optical path length from an objective lens to a light focusing position of the light flux.

In this phase modulation device, preferably, the first aberration component includes a third-order spherical aberration component of the wave front aberration, and the second aberration component includes a fifth-order spherical aberration component of the wave front aberration.

Further, in this phase modulation device, preferably, the plurality of first electrodes and the plurality of second electrodes are respectively a plurality of concentric annular electrodes about the optical axis of the optical system, and the plurality of first electrodes and the plurality of second electrodes are disposed such that a distance from the optical axis to the electrode which is the nearest to the optical axis among the electrodes with which the amount of phase modulation imparted to a light flux by the first phase modulation element is at an extreme value among the plurality of first electrodes is greater than a distance from the optical axis to the electrode which is the nearest to the optical axis among the electrodes with which the amount of phase modulation imparted to a light flux by the second phase modulation element is at an extreme value among the plurality of second electrodes.

Further, according to another embodiment of the invention, a phase modulation device for correcting wave front aberrations generated by an optical system including an objective lens disposed on an optical path of a light flux of light to be emitted from a light source is provided. The phase modulation device includes a phase modulation element which includes, on one surface of the phase modulation element through which a light flux is transmitted, a plurality of first electrodes disposed to impart to the light flux the amount of phase modulation to cancel a phase distribution in accordance with a first ratio of a second aberration component of a wave front aberration to a first aberration component of the wave front aberration; includes, on the other surface facing the one surface, a plurality of second electrodes disposed to impart to the light flux the amount of phase modulation to cancel a phase distribution in accordance with a second ratio smaller than the first ratio of the second aberration component of the wave front aberration to the first aberration component of the wave front aberration; and modulates a phase of the light flux in accordance with a voltage applied to each of the plurality of first electrodes and the plurality of second electrodes, and a control circuit which controls voltages applied to the plurality of first electrodes and voltages applied to the plurality of second electrodes in accordance with an optical path length from an objective lens to a light focusing position of the light flux.

Further, according to still another embodiment of the invention, a laser microscope is provided. The laser microscope includes: a coherent light source which irradiates coherent light; a first optical system disposed on an optical path of a light flux of the coherent light which includes an objective lens to focus the light flux on a specimen; a second optical system which transmits a light flux including specimen information derived from the specimen to a detector; and the phase modulation device which includes one of the above configurations. The phase modulation element of the phase modulation device is disposed between the coherent light source and the objective lens.

Advantageous Effects of Invention

According to the invention, the phase modulation device can correct aberrations generated by an optical system including an objective lens, even though a distance from the objective lens to the position where a light flux is focused varies.

BRIEF DESCRIPTION OF DRAWINGS

FIG. 10 is a view illustrating an arrangement pattern of annular electrodes of each phase modulation element, which pattern corresponds to the quantized phase modulation profile illustrated in FIG. 9B.

FIG. 15 is a view illustrating an arrangement pattern of annular electrodes of the two phase modulation elements which corresponds to the quantized phase modulation profile illustrated in FIG. 14B.

DESCRIPTION OF EMBODIMENTS

Figure 1:
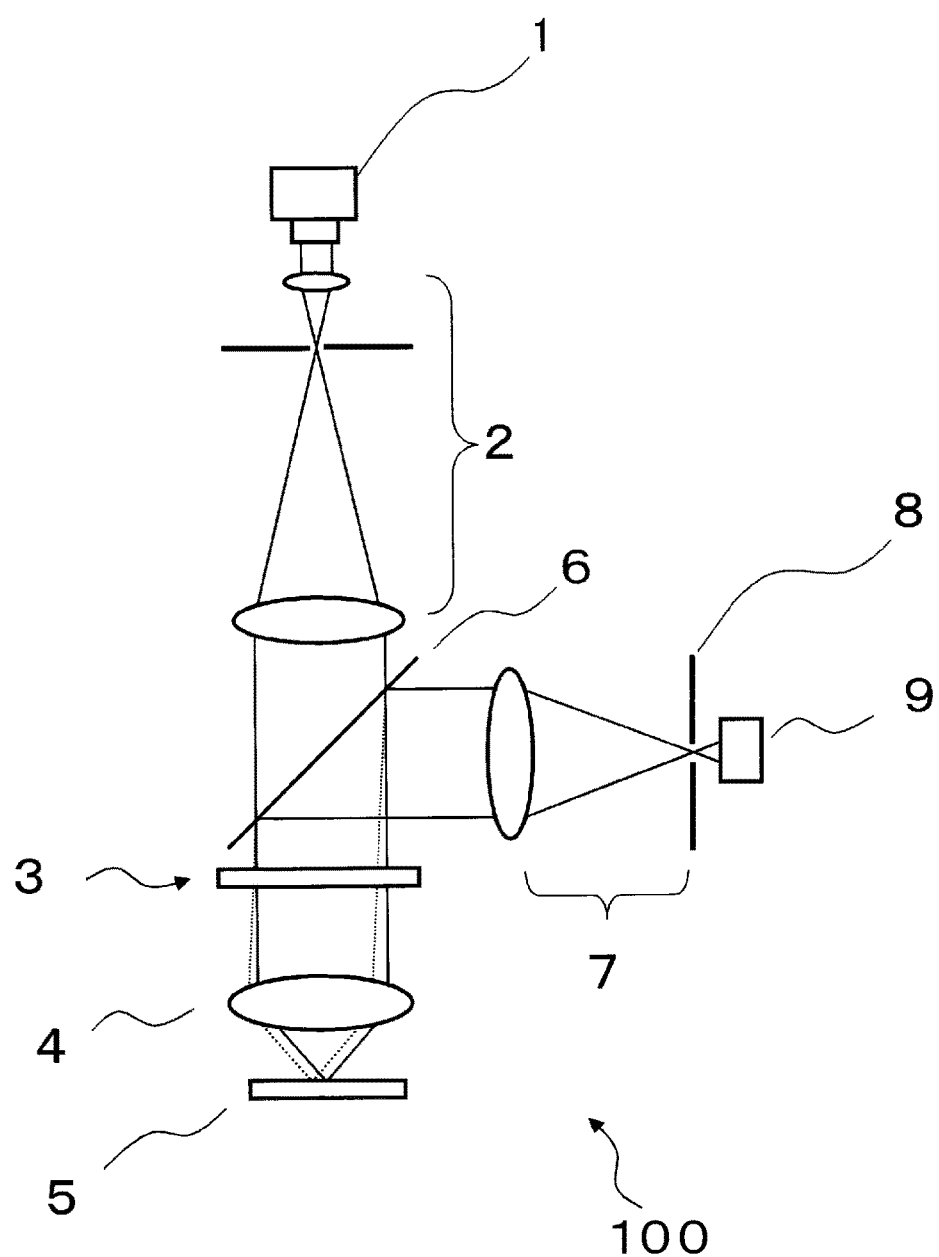
FIG. 1 is a schematic configuration diagram of a laser microscope including a phase modulation device according to one embodiment of the invention.

In the following, preferred embodiments of a phase modulation device and a laser microscope utilizing the phase modulation device according to the invention are described in detail referring to the drawings. In order to correct wave front aberrations generated by an optical system including an objective lens, this phase modulation device includes at least two phase modulation elements that can display a phase modulation profile to cancel a phase distribution of the wave front aberrations. The phase modulation profile displayed by each phase modulation element includes a third-order spherical aberration component and a fifth-order spherical aberration component at different ratios, and the ratios respectively correspond to the light focusing position of a light flux focused by the objective lens from the objective lens (hereinafter referred to simply as light focusing position), i.e., a depth of a specimen as an object to be observed. Therefore, even though this phase modulation device is not disposed on the pupil plane of an objective lens and a distance from the objective lens to the light focusing position varies, this phase modulation device can properly correct wave front aberrations by adjusting a ratio in the amount of phase modulation based on a phase modulation profile displayed on each phase modulation element.

FIG. 1 is a schematic configuration diagram of a laser microscope 100 according to one embodiment of the invention. A light flux emitted from a laser light source 1 as a coherent light source is adjusted by a collimating optical system 2 into parallel light beam. After the parallel light beam is transmitted through a phase modulation device 3 disposed between the collimating optical system 2 and an objective lens 4, the modulated light is focused on a specimen 5 through the objective lens 4. A light flux including specimen information such as a light flux reflected or scattered on the specimen 5 or fluorescent light generated on the specimen returns along an optical path, is transmitted through the objective lens 4 and the phase modulation device 3 again, is reflected on a beam splitter 6, and is focused on a confocal pinhole 8 by a confocal optical system 7 as a second optical system. The confocal pinhole 8 cuts a light flux on the specimen at a position other than the focus position. Therefore, it is possible to obtain a signal having a good S/N ratio by a detector 9.

The objective lens 4 is designed taking into consideration parameters including not only the inside of a lens system, but also a refractive index of the optical path from a lens tip to an observation plane and a distance therebetween, for example, a thickness of a cover glass or the presence or absence of a cover glass so as to optimize imaging performance with these estimated values. According to the above configuration, aberrations may be generated due to the depth of a biospecimen as an object to be observed, or a thickness deviation resulting from manufacturing error of a cover glass. The aberrations may lower the imaging performance. The laser microscope 100 is configured to enhance the imaging performance by estimating wave front aberrations generated by an optical system including the objective lens 4 from the laser light source 1 to the light focusing position of a light flux in accordance with the deviation of the optical path length from the design value; by cancelling a phase distribution of the wave front aberrations; and by displaying, as a phase modulation profile on the phase modulation device 3, a phase distribution such that the wave front of the light flux is a plane at a position where the light flux becomes a parallel light flux.

In this embodiment, the phase modulation device 3 may be disposed anywhere in an optical path formed by the optical system including the objective lens 4, and the phase modulation device 3 is preferably disposed at a position where a light flux transmitted through the phase modulation device 3 is a parallel light flux, such as between the collimating optical system 2 and the objective lens 4, as described above. This allows a phase modulation profile to be obtained by comparison between the wave front of a plane wave and the wave front with superimposed wave front aberrations generated by the optical system, and hence simplifies design of the phase modulation profile. Further, as in this embodiment, the phase modulation device 3 is disposed between the beam splitter 6 and the objective lens 4, whereby a light flux emitted from the laser light source 1 passes through the phase modulation device 3 twice along an outward path and along a return path. Therefore, the phase modulation device 3 can correct the phase of the light flux along the outward path and along the return path. In general, an objective lens in a microscope is designed to be an infinite system, and a light flux incident on the objective lens is a parallel light beam. In view of the above, it is preferable to dispose the phase modulation device 3 on the light source side of the objective lens 4, specifically, at a position in the vicinity of the objective lens 4. Disposing the phase modulation device 3 as described above is advantageous for the laser microscope 100 to effectively obtain the correction effects.

Figure 2A:
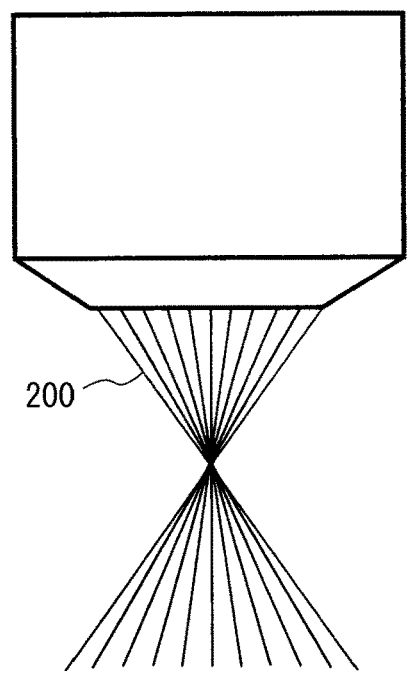
FIG. 2A is a diagram for representing aberrations generated in observing the surface of a specimen.
Figure 2B:
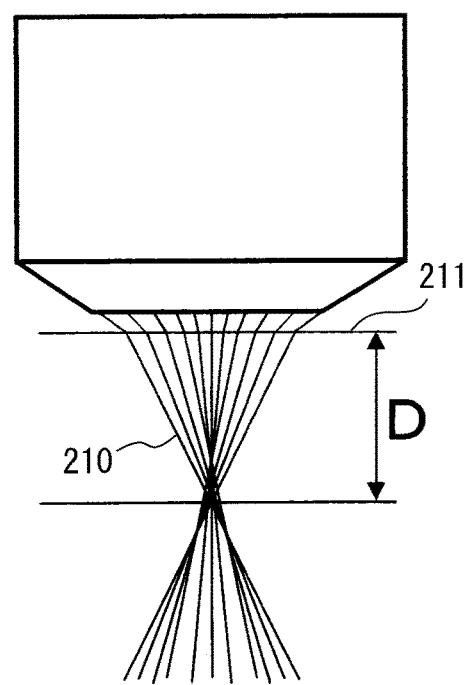
FIG. 2B is a diagram for representing aberrations generated in observing the inside of a specimen at the depth D from the surface of the specimen.

Aberrations which may be generated are described in detail. FIG. 2A and FIG. 2B are diagrams schematically illustrating aberrations generated depending on the depth of a specimen to be observed. To simplify the description, the objective lens is designed to be optimized in observing a medium having a uniform refractive index. FIG. 2A illustrates a light flux 200 in observing a medium having a uniform refractive index, as used in the design. FIG. 2A illustrates that the light flux 200 is focused on one point without aberrations. Contrary to the above, FIG. 2B illustrates a light flux 210 in observing the plane of the depth D from the surface of a specimen. The light flux 210 is refracted on an boundary face 211 between the medium in contact with the objective lens and the specimen. Thus, the light flux 210 is not focused on one point due to the generated aberrations.

As described above, aberrations are not generated when observing the surface of a specimen, but are generated when observing the inside of the specimen. The generated aberrations are represented as the wave front aberrations of the optical system including the objective lens 4. The phase modulation device 3 generates a phase distribution such that a phase distribution due to wave front aberrations at a position where the phase modulation device 3 is disposed can be cancelled. According to this configuration, the laser microscope is operable to focus a light flux from the laser light source 1 on one point at an observation position defined on the surface of a specimen or in the inside of the specimen. In the same manner, a light flux generated on the specimen returns along the optical path and therefore, the laser microscope can convert the light flux into a plane wave.

Wave front aberrations can be decomposed into components and be represented as a sum of the components. It is common to resolve wave front aberrations into orthogonal functions such as Zernike polynomials, and to represent the wave front aberrations as a sum of the functions. In view of the above, there is supposed a method for obtaining a correction amount for wave front aberrations by representing the correction amount as a phase distribution of each of the functions of Zernike polynomials, and by changing the relative amount of phase modulation of each of the functions. For instance, when aberrations are resolved using the standard Zernike polynomials, the 13-th coefficient ($Z_{13}$) represents third-order spherical aberration, and 25-th coefficient ($Z_{25}$) represents fifth-order spherical aberration. By appropriately adjusting the phase distribution of a correction amount corresponding to each of the coefficients, the phase modulation device 3 can correct the third-order spherical aberration and the fifth-order spherical aberration.

Aberrations generated in observing a deep part of a specimen are complex aberrations as combination of defocus or lower-order spherical aberrations and higher-order spherical aberrations. For instance, even though the phase modulation device 3 corrects $Z_{13}$, improvement of the imaging performance is not sufficient.

Actually, however, defocus sensitively changes depending on the depth D of a specimen. Therefore, defocus is determined by the observation position of the specimen. It is possible to neglect aberrations other than $Z_{13}$ and $Z_{25}$ in Zernike polynomials, because these aberrations are very small. Thus, it is possible to enhance the imaging performance by correcting the term $Z_{13}$ corresponding to third-order spherical aberration and the term $Z_{25}$ corresponding to fifth-order spherical aberration. Further, it is possible to correct aberrations sufficiently satisfactorily by taking into consideration defocus, third-order spherical aberration, and fifth-order spherical aberration, and even seventh-order spherical aberration in some cases.

Figure 3A:
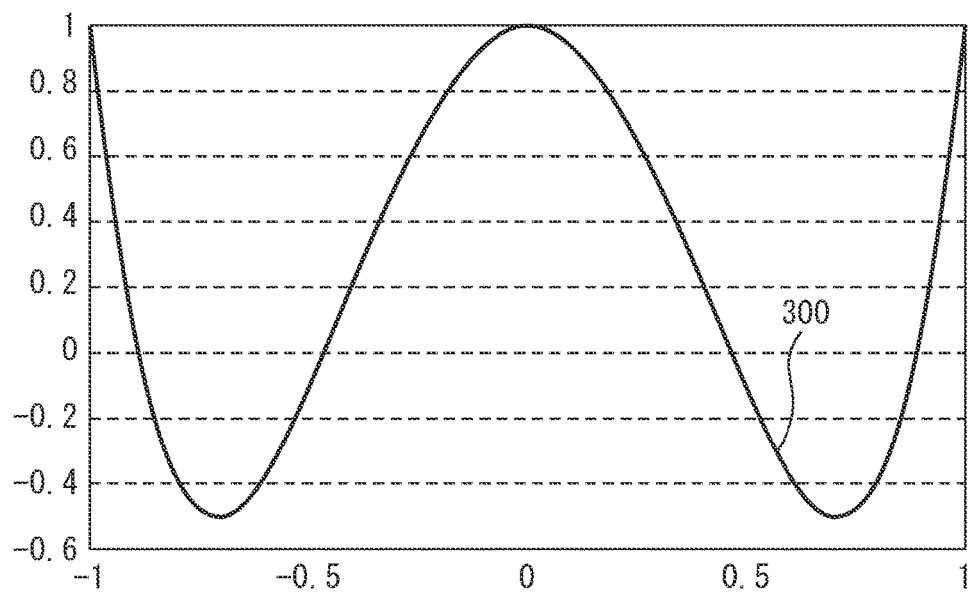
FIG. 3A is a diagram illustrating an example of a phase distribution of a third-order spherical aberration.
Figure 3B:
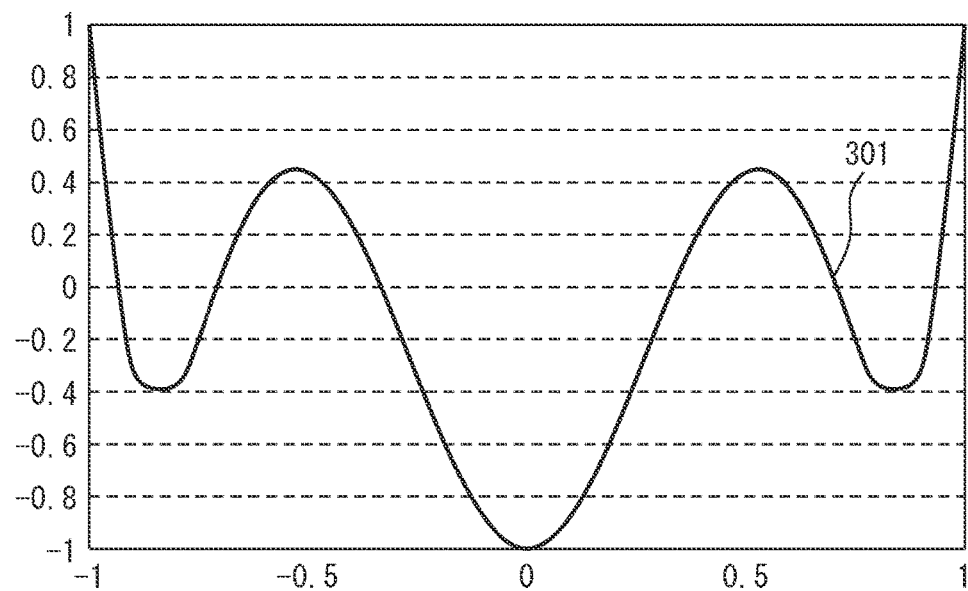
FIG. 3B is a diagram illustrating an example of a phase distribution of a fifth-order spherical aberration.

In order to correct the third-order spherical aberration and the fifth-order spherical aberration, it is preferable to create a phase modulation profile considering phase distributions corresponding to respective aberrations. FIG. 3A illustrates a graph 300 representing a phase distribution of third-order spherical aberration, and FIG. 3B illustrates a graph 301 representing a phase distribution of fifth-order spherical aberration. The aberrations in this case have a point-symmetric phase distribution. Each of the graphs illustrates a sectional view of the phase distribution. Further, the vertical axis indicates a value obtained by normalizing the phase difference, setting that the positive maximum value of the phase difference is "1", and the horizontal axis indicates a value obtained by normalizing the effective diameter, setting that the maximum value of the effective diameter is "1". In other words, the position "0" on the horizontal axis corresponds to a position on the optical axis.

It is assumed that the phase distribution of actually generated aberrations is a linear sum of these aberrations. A phase distribution is obtained by adding an adequate phase distribution component resulting from defocus to the phase distribution of a spherical aberration component which is the sum of a third-order spherical aberration component and a fifth-order spherical aberration component. Then, a profile, whose polarity is opposite to the polarity of the obtained phase distribution and which cancels the phase distribution, is defined as a phase modulation profile. For instance, in the case of an immersion objective lens having a numerical aperture NA of 1.0, the ratio between the third-order spherical aberration and the fifth-order spherical aberration generated on the pupil plane of the objective lens 4 is about 4:1, and it is possible to define a profile, whose polarity is opposite to the polarity of a phase distribution obtained by adding a phase component resulting from defocus to the linear sum of these spherical aberrations, as a phase modulation profile.

As described above, in correcting aberrations by a correction ring, it is necessary to repeat operation of the correction ring and focusing, which makes the optimization process long and complicated. However, by correcting a phase distribution (a defocus component) that results from focusing as a phase modulation profile by the phase modulation device 3, it possible to eliminate the repeating process for optimization, and to efficiently correct aberrations.

Figure 4:
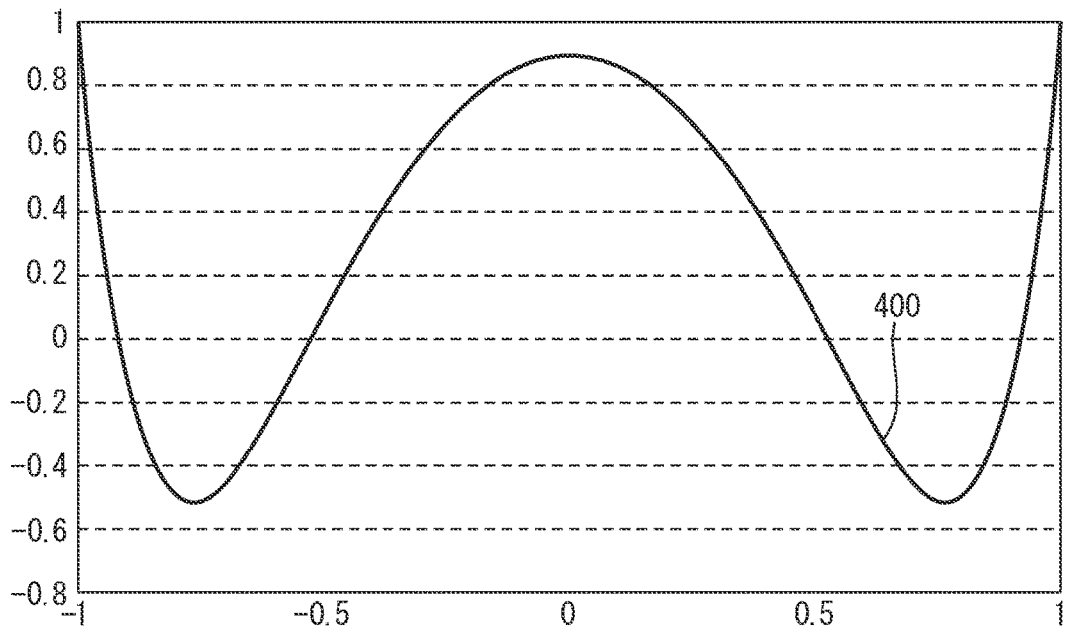
FIG. 4 is a diagram illustrating a sectional profile of a phase distribution of complex aberrations that minimizes the RMS value.

Next, a phase modulation profile for use in actually correcting aberrations by the phase modulation device 3 is described in details by an example. It is conceived that a phase distribution that remains by focusing matches with a shape such that the root mean square (RMS) value of the wave front having the phase distribution is minimum. Therefore, for instance, there is proposed a method, in which a phase distribution of complex aberrations including a defocus term is obtained in such a manner that the RMS aberration is minimized, and a phase modulation profile is defined from the phase distribution. A graph 400 illustrated in FIG. 4 represents a phase distribution of complex aberrations in which a defocus component and a spherical aberration generated by an objective lens whose numerical aperture NA is 1.0 are added in such a manner that the RMS aberration is minimized.

Figure 5:
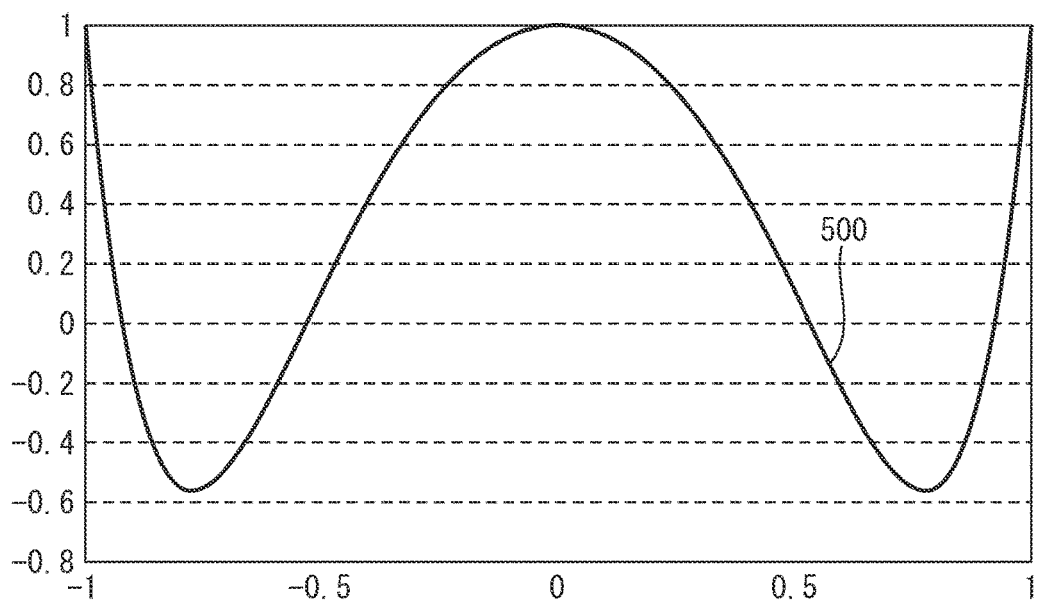
FIG. 5 is a diagram illustrating a sectional profile of a phase distribution of complex aberrations that minimizes the PV value of the amount of phase modulation.

Further, there is proposed an approach, in which a defocus component is added so that the amount of phase modulation (hereinafter, referred to as a PV value) of a phase distribution is minimized, and a phase distribution corresponding to the minimum amount of phase modulation is defined as a phase modulation profile. A graph 500 illustrated in FIG. 5 represents a phase distribution of complex aberrations when a defocus component is added in such a manner that the PV value is minimized. When the PV value is minimized, it is possible to set the phase modulation range (i.e. range of the amount of phase modulation) to be small. Therefore, when a liquid crystal element is used as a phase modulation element in the phase modulation device, it is possible to make the thickness of the liquid crystal layer of the liquid crystal element to be small. Further, generally, a response time of a liquid crystal element is proportional to a square of the thickness of a liquid crystal layer. Therefore, the smaller the phase modulation range is, the higher the response speed is. Further, the smaller the thickness of the liquid crystal layer is, the more the surface precision is.

Further, it is assumed that the phase distribution that remains by focusing varies depending on the specifications of the microscope for use or the image processing software for use. It is possible to optimize the aberration correction by matching a residual aberration pattern specific to each of the microscope and the image processing software with the phase modulation profile of the phase modulation device.

Figure 6A:
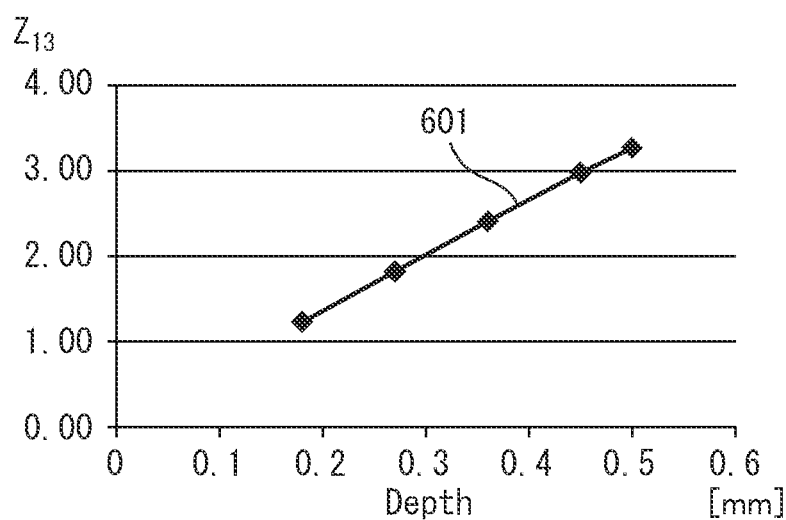
FIG. 6A is a graph illustrating a relationship between a depth from the surface of a specimen and a third-order spherical aberration component generated in an optical system including an objective lens.
Figure 6B:
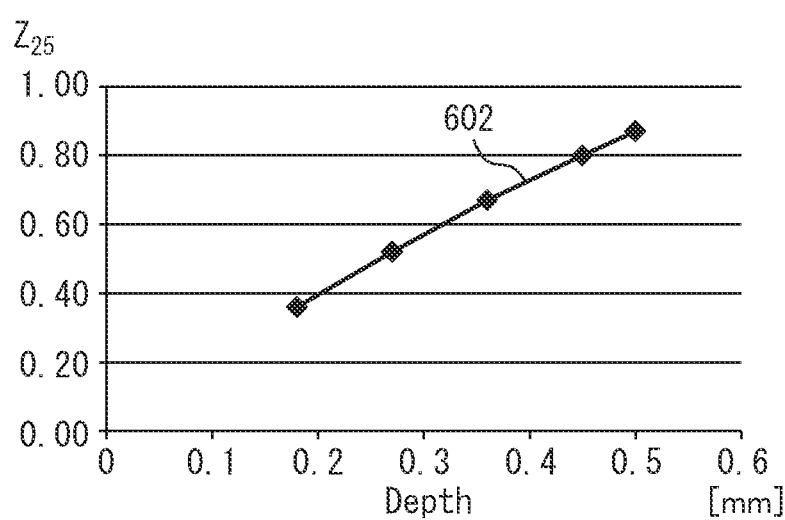
FIG. 6B is a graph illustrating a relationship between a depth from the surface of a specimen and a fifth-order spherical aberration component generated in the optical system.

In addition, third-order spherical aberration components and fifth-order spherical aberration components respectively vary in accordance with a distance from the objective lens 4 to the light focusing position. FIGS. 6A and 6B are respectively graphs illustrating a relationship between a depth from the surface of a specimen with a refractive index of 1.4 and a third-order spherical aberration component or a fifth-order spherical aberration component generated in the optical system including the objective lens 4, at a position 1 mm away from the immersion objective lens whose numerical aperture is 1.1 on the side of it opposite from the specimen disposed side. In FIGS. 6A and 6B, the horizontal axis indicates a depth [mm]. FIG. 6A, the vertical axis indicates a Zernike coefficient ($Z_{13}$) corresponding to a third-order spherical aberration component, and in FIG. 6B, the vertical axis indicates a Zernike coefficient ($Z_{25}$) corresponding to a fifth-order spherical aberration component. The line 601 indicates a relationship between a depth from the surface of a specimen and a Zernike coefficient corresponding to a third-order spherical aberration component, and the line 602 indicates a relationship between a depth from the surface of a specimen and a Zernike coefficient corresponding to a fifth-order spherical aberration component.

Figure 6C:
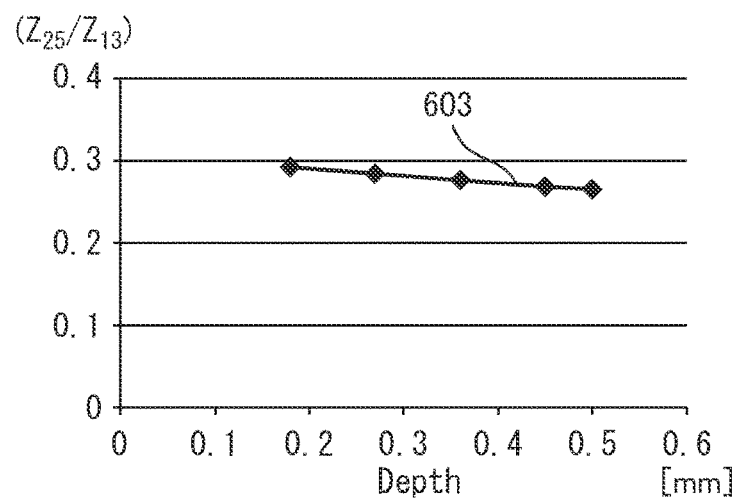
FIG. 6C is a graph illustrating a relationship between a depth from the surface of a specimen and the ratio of the fifth-order spherical aberration component to the third-order spherical aberration component, both of which are illustrated in FIGS. 6A and 6B.

FIG. 6C is a graph illustrating a relationship between a depth from the surface of a specimen and the ratio of the fifth-order spherical aberration component to the third-order spherical aberration component, both of which are illustrated in FIGS. 6A and 6B. In FIG. 6C, the horizontal axis indicates a depth [mm] from the surface of a specimen, and the vertical axis indicates the ratio of the fifth-order spherical aberration component to the third-order spherical aberration component. Then, the line 603 indicates a relationship between a depth from the surface of a specimen and the ratio of the fifth-order spherical aberration component to the third-order spherical aberration component.

As illustrated in FIGS. 6A and 6B, both the third-order spherical aberration component and the fifth-order spherical aberration component increase as a depth from the surface of a specimen increases. However, as illustrated in FIG. 6C, the ratio of the fifth-order spherical aberration component to the third-order spherical aberration component decreases from about 0.29 to about 0.26 as a depth from the surface of a specimen increases. Accordingly, for example, when one of the two phase modulation elements can display a phase modulation profile in which the ratio of the fifth-order spherical aberration component to the third-order spherical aberration component is about 0.29, and when the other of the two phase modulation elements can display a phase modulation profile in which the ratio of the fifth-order spherical aberration component to the third-order spherical aberration component is about 0.26, the ratio in the amount of phase modulation based on the phase modulation profiles displayed on the two phase modulation elements can be adjusted, whereby the phase modulation device 3 can properly correct the third-order spherical aberration component and the fifth-order spherical aberration component relative to any depth.

Next, the phase modulation device 3 configured such that a liquid crystal element is used as a phase modulation element and such that a phase distribution that cancels wave front aberrations is displayed as a phase modulation profile on the liquid crystal element is described in detail.

Figure 7A:
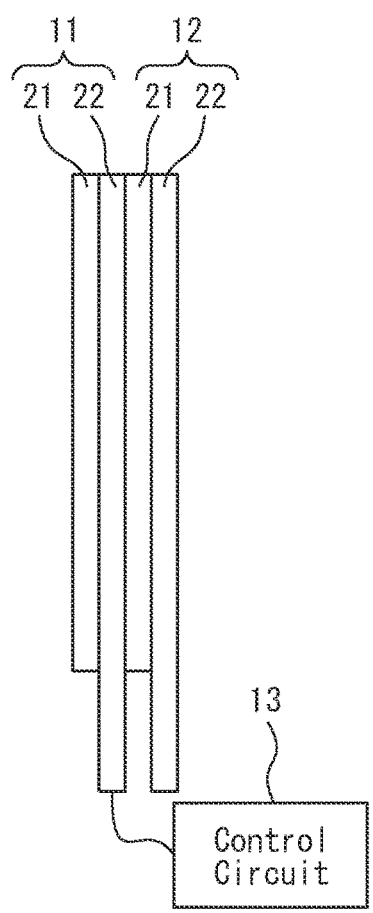
FIG. 7A is a schematic configuration diagram of a phase modulation device.

FIG. 7A is a schematic configuration diagram of the phase modulation device 3. The phase modulation device 3 includes two phase modulation elements 11 and 12, which are disposed along the optical axis of an optical system including an objective lens 4, in a light flux passing through the optical system; and a control circuit 13 for adjusting a voltage applied to the two phase modulation elements 11 and 12, thereby controlling the amount of phase modulation imparted to the light flux transmitted through the phase modulation elements 11 and 12. The control circuit 13 includes, for instance, a processor, a memory, and a drive circuit capable of changing the voltages to be output in accordance with a drive signal from the processor.

Figure 7B:
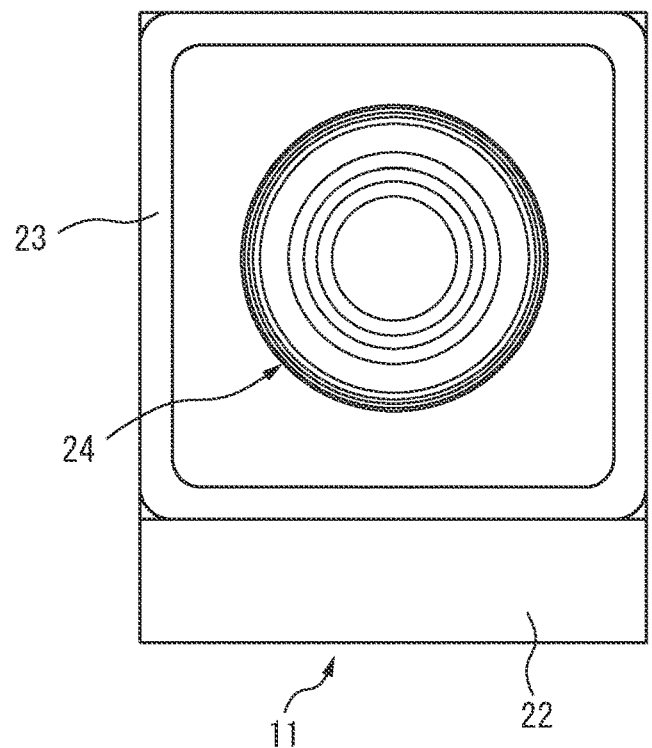
FIG. 7B is a plan view of a phase modulation element.

FIG. 7B is a plan view of a phase modulation element 11. The phase modulation elements 11 and 12 can be configured in the same manner except for the arrangement pattern of transparent electrodes. As such, only the phase modulation element 11 will be described in terms of the structure of the phase modulation element except for the arrangement pattern of transparent electrodes.

As illustrated in FIGS. 7A and 7B, a liquid crystal layer of the phase modulation element 11 is sandwiched between transparent substrates 21 and 22, and the periphery of the liquid crystal layer is sealed by a sealing member 23 so as to prevent leakage of liquid crystal. A plurality of transparent annular electrodes are concentrically formed, the center of which is the optical axis, in the active region 24 on the opposed surfaces of the transparent substrates 21 and 22 which drives the liquid crystal, in other words, in a region where a phase of a transmitting light flux can be modulated. On any one of the transparent substrates 21 and 22, the transparent electrode may be formed to entirely cover the active region 24. The active region 24 has a size determined in accordance with the pupil diameter of the objective lens 4. By controlling the voltages to be applied to the transparent annular electrodes by a control circuit 13 in the phase modulation device 3, it possible to impart an intended phase distribution concentric about the optical axis to a light flux transmitted through the phase modulation element 11.

Figure 8:
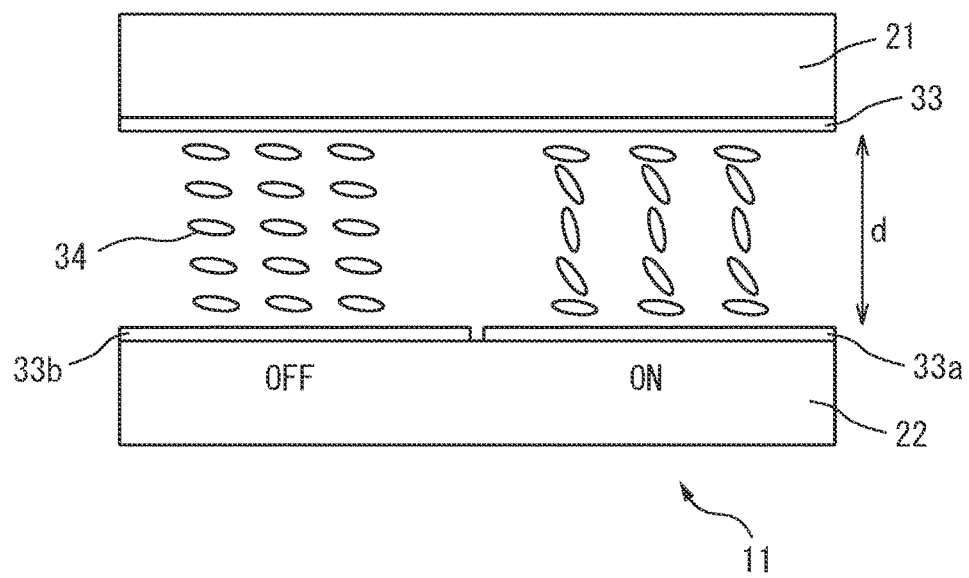
FIG. 8 is a sectional schematic view of a part of the active region of the phase modulation element illustrated in FIG. 7B.

FIG. 8 is a sectional schematic view of a part of the active region 24 of the phase modulation element 11 in FIGS. 7A and 7B. The phase modulation element 11 is configured such that liquid crystal molecules 34 are sandwiched between the transparent substrates 21 and 22. Transparent electrodes 33, 33a, and 33b are formed on the surfaces of the transparent substrates 21 and 22 disposed to face each other. FIG. 8 illustrates a state that a voltage is applied between the transparent electrode 33a on the right half side and the transparent electrode 33, and a voltage is not applied between the transparent electrode 33b on the left half side and the transparent electrode 33. The liquid crystal molecules 34 have an elongated molecular structure and are homogeneously aligned. Specifically, the liquid crystal molecules 34 sandwiched between the two transparent substrates 21 and 22 are aligned to be parallel to each other in the major axis direction thereof, and are aligned in parallel to each boundary face between each of the transparent substrates 21 and 22 and the liquid crystal layer. A refractive index of the liquid crystal molecules 34 in the major axis direction and a refractive index thereof in a direction orthogonal to the major axis direction differ from each other, and a refractive index $n_e$ with respect to a polarized component (extraordinary ray) in parallel to the major axis direction of the liquid crystal molecules 34 is commonly higher than a refractive index $n_o$ with respect to a polarized component (ordinary ray) in parallel to the minor axis direction of the liquid crystal molecules. Therefore, the phase modulation element 11 configured such that the liquid crystal molecules 34 are homogeneously aligned acts as a uni-axial birefringent element.

Liquid crystal molecules have a dielectric anisotropy, and generally, a force is exerted on the liquid crystal molecules such that the major axis of the liquid crystal molecules is aligned with the electric field direction. In other words, as illustrated in FIG. 8, when a voltage is applied between the electrodes provided in the two transparent substrates sandwiching the liquid crystal molecules therebetween, the major axis direction of the liquid crystal molecules is inclined from a state in parallel to the transparent substrates toward a direction orthogonal to the surfaces of the transparent substrates in accordance with the voltage. The refractive index $n_\psi$ of the liquid crystal molecules with respect to a light flux of a polarized component in parallel to the major axis of the liquid crystal molecules is represented by: $n_o \leq n_\psi \leq n_e$ (where $n_o$ is the refractive index of ordinary light, and $n_e$ is the refractive index of extraordinary light). Therefore, assuming that the thickness of the liquid crystal layer is d, an optical path length difference $\Delta nd (= n_\psi d - n_o d)$ is generated between the light flux passing through a region where a voltage is applied, and the light flux passing through a region where a voltage is not applied in the liquid crystal layer. The phase difference is $2\pi \Delta nd/\lambda$, where $\lambda$ is the wavelength of a light flux incident on the liquid crystal layer.

Next, a method for imparting an intended phase distribution to a light flux transmitted through the phase modulation element 11 configured as a liquid crystal element is described in detail. First of all, a phase distribution profile to be displayed is determined, and a voltage to be applied to each of the annular electrodes is determined by dividing the phase modulation profile at a fixed phase interval.

Figure 9A:
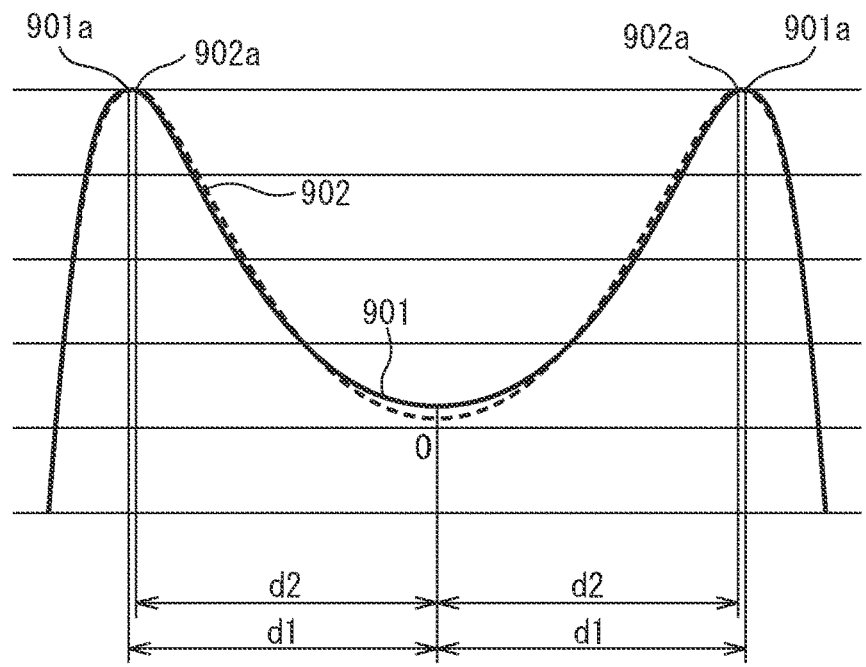
FIG. 9A is a sectional view of a phase modulation profile corresponding to a plane passing through the optical axis, which profile is displayed on each of the two phase modulation elements.

FIG. 9A is a sectional view of a phase modulation profile corresponding to a plane passing through the optical axis, which is displayed on each of the two phase modulation elements. This example assumes that the ratio of the fifth-order spherical aberration component to the third-order spherical aberration component ($Z_{25}/Z_{13}$) in the phase modulation profile displayed by the phase modulation element 11 is 0.292, and that the ratio of the fifth-order spherical aberration component to the third-order spherical aberration component ($Z_{25}/Z_{13}$) in the phase modulation profile displayed by the phase modulation element 12 is 0.24. In FIG. 9A, the horizontal axis indicates a position in a plane orthogonal to the optical axis. In the horizontal axis, the position of the optical axis is represented by 0. The vertical axis indicates the amount of phase modulation. The curve 901 indicated by a solid line represents a phase modulation profile displayed by the phase modulation element 11. The curve 902 indicated by a dotted line represents a phase modulation profile displayed by the phase modulation element 12. This example is such that the maximum value and the minimum value of the amount of phase modulation in the phase modulation profile 901 coincide with the maximum value and the minimum value of the amount of phase modulation in the phase modulation profile 902 respectively.

As indicated by the phase modulation profiles 901 and 902, those positions in the phase modulation profile which are at an extreme value (the maximum value in this example) in the amount of phase modulation and are nearest the optical axis are farther away from the optical axis as the ratio of the fifth-order spherical aberration component to the third-order spherical aberration component increases. In other words, the distance d1 from the optical axis to the position 901a corresponding to the extreme value nearest the optical axis in the phase modulation profile 901 is longer than the distance d2 from the optical axis to the position 902a corresponding to the extreme value nearest the optical axis in the phase modulation profile 902.

An arrangement pattern of annular electrodes of the phase modulation elements 11 and 12 is determined by quantizing the phase modulation profile such that phase differences between adjacent annular bands are equidistant. When phase differences between adjacent annular bands are equidistant, every two adjacent annular electrodes being connected with a resistor having the same resistance value can give a phase modulation profile which discretely approximates a phase modulation profile, as described below.

Figure 9B:
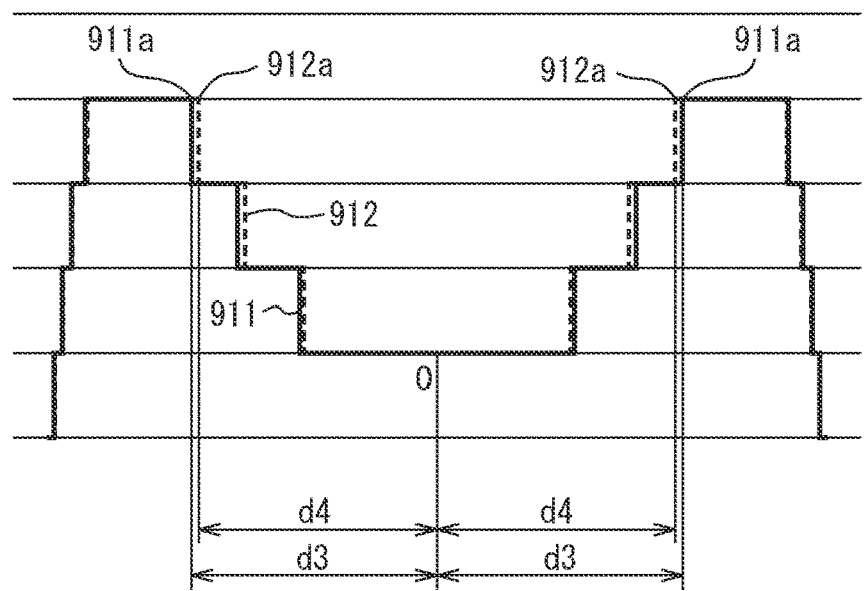
FIG. 9B is a sectional view of a phase modulation profile corresponding to a plane passing through the optical axis, which profile is obtained by quantizing the phase modulation profile illustrated in FIG. 9A.

FIG. 9B is a sectional view of a phase modulation profile corresponding to a plane passing through the optical axis, which profile is obtained by quantizing the phase modulation profile illustrated in FIG. 9A. In FIG. 9B, the horizontal axis indicates a position in a plane orthogonal to the optical axis. In the horizontal axis, the position of the optical axis is represented by 0. The vertical axis indicates the amount of phase modulation. The broken line 911 indicated by a solid line represents a phase modulation profile obtained by quantizing the phase modulation profile 901, and the broken line 912 indicated by a dotted line represents a phase modulation profile obtained by quantizing the phase modulation profile 902. In the same manner as in FIG. 9A, the distance d3 from the optical axis to the position 911a corresponding to the extreme value nearest the optical axis in the phase modulation profile 911 is longer than the distance d4 from the optical axis to the position 912a corresponding to the extreme value nearest the optical axis in the phase modulation profile 912.

FIG. 10 is a view illustrating an arrangement pattern of annular electrodes of the phase modulation elements 11 and 12, which corresponds to the quantized phase modulation profiles illustrated in FIG. 9B. As depicted on the upper side, the broken line 911 indicated by a solid line corresponds to the phase modulation profile 911 illustrated in FIG. 9B, and the broken line 912 indicated by a dotted line corresponds to the phase modulation profile 912 illustrated in FIG. 9B. On the lower side of FIG. 10, the annular electrodes pattern 1001 of the phase modulation element 11 determined according to the phase profile 911 and the annular electrodes pattern 1002 of the phase modulation element 12 determined according to the phase profile 912 are illustrated. For simplification, spaces between the annular electrodes, lead-out electrodes, or the like are not illustrated. By applying a voltage to each of the annular electrodes by the control circuit 13 in such a manner that a voltage difference between the adjacent annular electrodes corresponds to a fixed step in a voltage range in which characteristics of the amount of phase modulation to be imparted to a light flux transmitted through the phase modulation element 11 with respect to the applied voltage is substantially linear, the phase modulation element 11 can display a quantized phase modulation profile so that the ratio of the fifth-order spherical aberration component to the third-order spherical aberration component is 0.292. Similarly, by applying a voltage to each of the annular electrodes by the control circuit 13 in such a manner that a voltage difference between the adjacent annular electrodes corresponds to a fixed step in a voltage range in which characteristics of the amount of phase modulation to be imparted to a light flux transmitted through the phase modulation element 12 with respect to the applied voltage is substantially linear, the phase modulation element 12 can display a quantized phase modulation profile so that the ratio of the fifth-order spherical aberration component to the third-order spherical aberration component is 0.24.

As described above, the positions in the phase modulation profile which are at the maximum value in the amount of phase modulation, i.e., the extreme value nearest the optical axis, are farther away from the optical axis as the ratio of the fifth-order spherical aberration component to the third-order spherical aberration component increases. Because of this, the position corresponding to the maximum value in the amount of phase modulation imparted by the quantized phase modulation profile 911 is also positioned farther away from the optical axis than the position corresponding to the maximum value in the amount of phase modulation imparted by the quantized phase modulation profile 912. Accordingly, the distance d3 from the optical axis to the position of the transparent electrode 1001a which corresponds to the maximum value (the extreme value nearest the optical axis) in the amount of phase modulation imparted by the phase modulation profile in the phase modulation element 11 is longer than the distance d4 from the optical axis to the position of the transparent electrode 1002a which corresponds to the maximum value (the extreme value nearest the optical axis) in the amount of phase modulation imparted by the phase modulation profile in the phase modulation element 12.

In order to apply a voltage to each of the annular electrodes in such a manner that the voltage difference between the adjacent annular electrodes is the same step, the annular electrode corresponding to the position where the amount of phase modulation is maximum and the annular electrode corresponding to the position where the amount of phase modulation is minimum are determined from the phase profile. The control circuit 13 applies a voltage giving a maximum amount of phase modulation and a voltage giving a minimum amount of phase modulation to the respectively corresponding annular electrodes. Further, the annular electrodes adjacent to each other are connected by an electrode (a resistor) having the same electrical resistance. Therefore, the voltage difference between the annular electrodes adjacent to each other is the same step by resistance division. Further, controlling the applied voltages as described above is advantageous in simplifying the configuration of the control circuit 13, as compared with a circuit configured to control voltages to be applied to the annular electrodes independently of each other.

Figure 11:
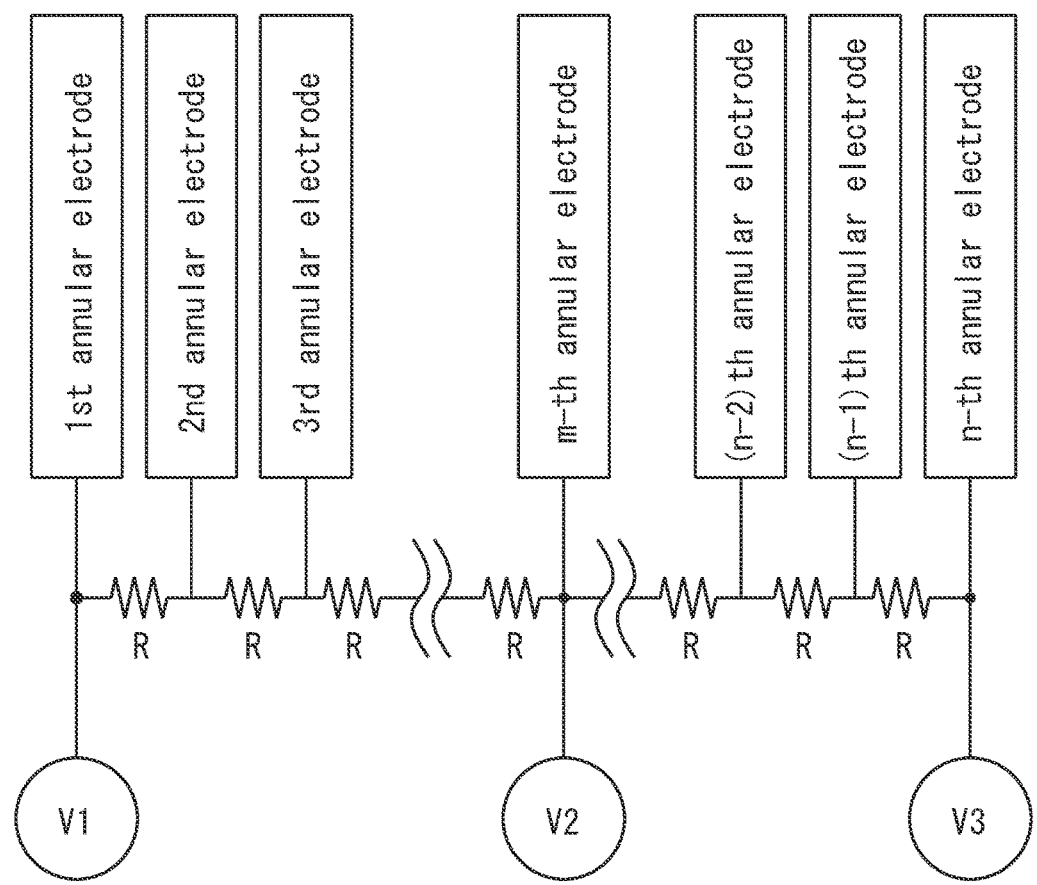
FIG. 11 is a diagram illustrating a relationship between each of the annular electrodes and a voltage to be applied in the case where each phase modulation element includes n annular electrodes.

FIG. 11 is a diagram illustrating a relationship between each of the annular electrodes and a voltage to be applied in the case where the phase modulation elements 11 and 12 include n annular electrodes. For example, the center electrode is referred to as the first annular electrode, the outermost peripheral annular electrode is referred to as the n-th annular electrode, and the annular electrode to which a maximum voltage is applied is referred to as the m-th annular electrode.

FIG. 11 illustrates annular electrodes to which the control circuit 13 applies voltages upon 3-level drive. In this example, a voltage V1 is applied to the first annular electrode at the center, a voltage V2 is applied to the m-th annular electrode, and a voltage V3 is applied to the n-th annular electrode at the outermost periphery. In this case, a voltage applied to the k-th annular electrode positioned between the first annular electrode and the m-th annular electrode is V1 plus the value of (V2−V1) multiplied by the ratio (R1/R2) of the total R1 of the resistance values between the k-th annular electrode and the first annular electrode to the total R2 of the resistance values between the first annular electrode and the m-th annular electrode. Similarly, a voltage applied to the l-th annular electrode positioned between the n-th annular electrode and the m-th annular electrode is V3 plus the value of (V3−V2) multiplied by the ratio (R3/R4) of the total R3 of the resistance values between the l-th annular electrode and the n-th annular electrode to the total R4 of the resistance values between the n-th annular electrode and the m-th annular electrode.

By selecting a defocus value in such a manner that the amounts of phase modulation at the center and at the end in a phase distribution of generated wave front aberrations are equal to each other, it possible to match the amount of phase modulation at the center electrode with the amount of phase modulation at the outermost peripheral electrode. In this case, the voltage value V3 applied to the annular electrode n at the outermost periphery is the same as the voltage V1 applied to the electrode at the center, and the phase modulation elements 11 and 12 can be driven at 2 levels of voltage. Further, by applying the voltages as described above, it possible to minimize the PV value. In this way, in the example of 2-level driving, it is possible to vary the amplitude of the amount of phase modulation without changing the relative ratio of the phase modulation profile, with use of a difference between the applied voltages V1 and V2. In addition, each annular electrode may be mutually isolated, and a voltage may be applied directly from the control circuit 13. In this case, by adjusting a voltage applied to each annular electrode, the control circuit 13 can cause the phase modulation elements 11 and 12 to display a desired phase modulation profile in accordance with the arrangement pattern of the annular electrodes.

Table 1 is a table illustrating a relationship of a depth from the surface of a specimen, an aberration generated by an optical system including an objective lens 4, and the amount of phase adjustment by each phase modulation element. Also in this example, the third-order spherical aberration and fifth-order spherical aberration relative to the observation depth, and the ratio of the fifth-order spherical aberration to the third-order spherical aberration, which are indicated in Table 1, correspond to FIGS. 6A to 6C described above. The generated aberration is indicated by a positive value and each aberration component of the phase modulation element that cancels this generated aberration is indicated by a negative value. It is assumed that the ratio of the fifth-order spherical aberration component to the third-order spherical aberration component in the phase modulation profile represented by the phase modulation element 11 is 0.292, and that the ratio of the fifth-order spherical aberration component to the third-order spherical aberration component in the phase modulation profile represented by the phase modulation element 12 is 0.24. It is also assumed that the maximum value of the amount of phase adjustment for the third-order spherical aberration component to which each phase modulation element can give singly is 1.8λ (λ represents a wavelength of a laser light emitted from a laser light source 1).

spherical aberration to the third-order spherical aberration is β (β=0.24 in Table 1). In addition, when it is assumed that the total of the third-order spherical aberration components of each phase modulation element (the reverse sign of the third-order spherical aberration component of the generated aberration) is x and that the total of the fifth-order spherical aberration components (the reverse sign of the fifth-order spherical aberration component of generated aberration) is y, the relationship between a, b, c, and d and x, y, α, and β is represented by the following equation.

$$a+c=x \quad \text{Equation 1}$$

$$b+d=y \quad \text{Equation 2}$$

$$b/a=\alpha \quad \text{Equation 3}$$

$$d/c=\beta \quad \text{Equation 4}$$

Therefore, by solving the above simultaneous equations assuming that the respective reverse signs of the respective-order spherical aberration components of the generated aberrations are x and y, the phase modulation components, a, b, c, and d, of the respective-order spherical aberrations to be imparted by the respective phase modulation elements 11 and 12 are calculated.

By applying a voltage (V) such that the amount of phase modulation identical to the calculated phase modulation component is imparted to each amount of phase modulation

TABLE 1

| | Generated Aberration | | | Phase Modulation Element 11 Fifth-order:Third-order = 1:0.292 | | | Phase Modulation Element 12 Fifth-order:Third-order = 1:0.24 | | | Phase Modulation Elements 11 + 12 Total | | |
|---|---|---|---|---|---|---|---|---|---|---|---|---|
| Observation Depth (mm) | Third-order spherical aberration amount (λ) | Fifth-order spherical aberration amount (λ) | Fifth-order/Third-order | Third-order spherical aberration component a (λ) | Fifth-order spherical aberration component b (λ) | Voltage (V) | Third-order spherical aberration component c (λ) | Fifth-order spherical aberration component d (λ) | Voltage (V) | Third-order spherical aberration component x (λ) | Fifth-order spherical aberration component y (λ) | Fifth-order/Third-order |
| 0.180 | 1.230 | 0.360 | 0.292 | −1.230 | −0.359 | 0.915 | 0.000 | 0000 | 0.000 | −1.230 | −0.359 | 0.292 |
| 0.270 | 1.820 | 0.520 | 0.284 | −1.521 | −0.444 | 1.132 | −0.302 | −0.072 | 0.217 | −1.823 | −0.517 | 0.284 |
| 0.360 | 2.410 | 0.670 | 0.276 | −1.669 | −0.487 | 1.240 | −0.745 | −0.179 | 0.536 | −2.414 | −0.666 | 0.276 |
| 0.450 | 2.980 | 0.800 | 0.268 | −1.521 | −0.444 | 1.130 | −1.463 | −0.351 | 1.052 | −2.985 | −0.795 | 0.268 |
| 0.500 | 3.270 | 0.870 | 0.265 | −1.570 | −0.458 | 1.168 | −1.703 | −0.409 | 1.224 | −3.273 | −0.867 | 0.265 |

As indicated in Table 1, as the observation depth increases, the generated third-order spherical aberration and fifth-order spherical aberration both increase, but the ratio of the fifth-order spherical aberration to the third-order spherical aberration decreases. The voltage (V) indicated in the column for each phase modulation element is a voltage value applied across the annular electrode with the greatest amount of phase modulation and the annular electrode with the smallest amount of phase modulation, and in this example, the voltage value V corresponds to (V2−V3) as illustrated in FIGS. 10 and 11.

It is assumed that the third-order spherical aberration component of the phase modulation element 11 is a, the fifth-order spherical aberration component is b, and the ratio of the fifth-order spherical aberration to the third-order spherical aberration is α (α=0.292 in Table 1), and that the third-order spherical aberration component of the phase modulation element 12 is c, the fifth-order spherical aberration component is d, and the ratio of the fifth-order element, the phase modulation device 3 can correct the generated aberration. The ratios between the third-order spherical aberration component and the fifth-order spherical aberration component in the respective phase modulation elements 11 and 12 are fixed at any value, α and β respectively, and accordingly, when one of a and c of the third-order spherical aberration component or one of b and d of the fifth-order spherical aberration component is determined, the other is uniquely determined without being calculated.

Figure 12A:
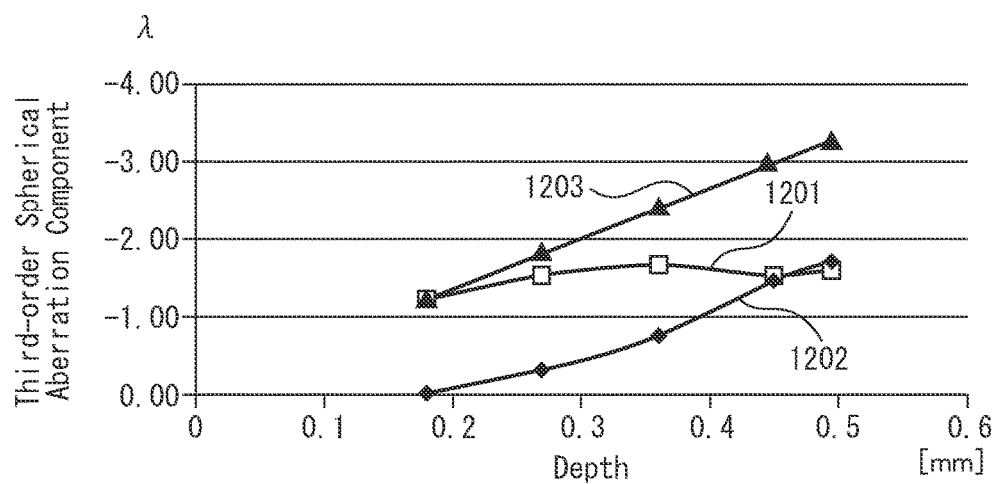
FIG. 12A is a view of an example illustrating a relationship between a depth from the surface of a specimen and a correction amount of a third-order spherical aberration component in accordance with a phase modulation profile displayed by each phase modulation element and with combinations thereof.
Figure 12B:
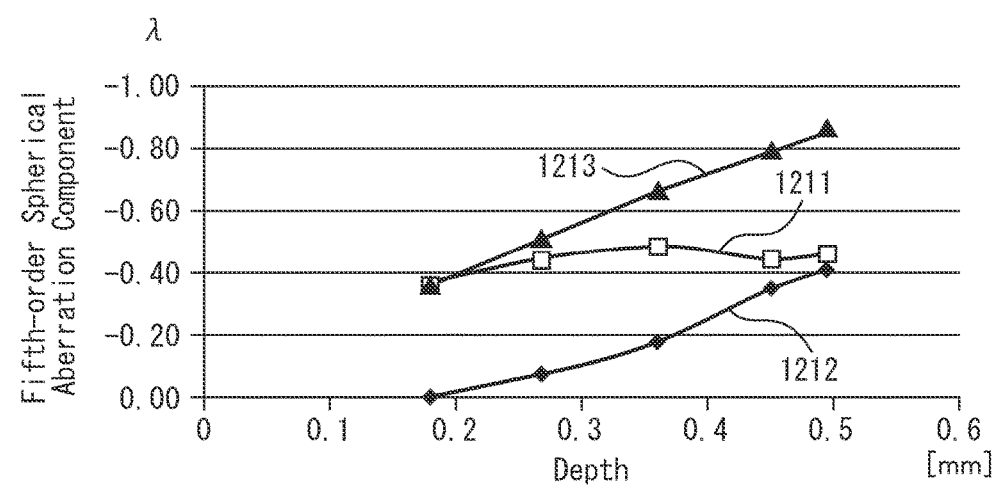
FIG. 12B is a view of an example illustrating a relationship between a depth from the surface of a specimen and a correction amount of the fifth-order spherical aberration component in accordance with a phase modulation profile displayed by each phase modulation element and with combinations thereof.

FIG. 12A is a view of an example illustrating a relationship between a depth from the surface of a specimen and the third-order spherical aberration component to be cancelled in accordance with the phase modulation profiles displayed by the respective phase modulation elements and with combinations thereof, and corresponds to Table 1. FIG. 12B is a view of an example illustrating a relationship between a depth from the surface of a specimen and the fifth-order spherical aberration component to be cancelled in accordance with the phase modulation profiles displayed by the respective phase modulation elements and with combinations thereof, and corresponds to Table 1. In FIGS. 12A and 12B, the horizontal axis indicates a depth from the surface of a specimen, and the vertical axis indicates the amount of phase adjustment in wavelength units. In FIG. 12A, the line 1201 indicates a relationship between a depth from the surface of a specimen and the third-order spherical aberration component cancelled by the phase modulation element 11. The line 1202 indicates a relationship between a depth from the surface of a specimen and a correction amount of the third-order spherical aberration component cancelled by the phase modulation element 12. The line 1203 indicates a relationship between a depth from the surface of a specimen and the total of the third-order spherical aberration component cancelled by the phase modulation element 11 and the third-order spherical aberration component cancelled by the phase modulation element 12. Similarly, in FIG. 12B, the line 1211 indicates a relationship between a depth from the surface of a specimen and the fifth-order spherical aberration component cancelled by the phase modulation element 11. The line 1212 indicates a relationship between a depth from the surface of a specimen and the fifth-order spherical aberration component cancelled by the phase modulation element 12. The line 1213 indicates a relationship between a depth from the surface of a specimen and the total of the fifth-order spherical aberration component cancelled by the phase modulation element 11 and the fifth-order spherical aberration component cancelled by the phase modulation element 12.

As indicated in Table 1 and FIGS. 12A and 12B, even though the ratio between the third-order spherical aberration component and the fifth-order spherical aberration component varies in accordance with a depth from the surface of a specimen, by adjusting a voltage applied to the annular electrodes that the phase modulation element 11 and the phase modulation element 12 have, it can make the amount of phase modulation variable overall, although the ratio of the respective-order spherical aberration components cancelled by each phase modulation element does not change. The amount of phase modulation imparted overall to a light flux by the phase modulation device 3 is the total, in each voltage, of the amount of phase modulation imparted by the phase modulation element 11 and the amount of phase modulation imparted by the phase modulation element 12. As a result, it is understood that the phase modulation device 3 can successfully correct the third-order spherical aberration and the fifth-order spherical aberration independent of a depth from the surface of a specimen.

The control circuit 13 previously stores, for example in a memory that the control circuit 13 has, a reference table which indicates a relationship between a depth from the surface of a specimen and a voltage applied to each annular electrode of the phase modulation elements 11 and 12. Then, the control circuit 13 refers to the reference table, may determine a voltage applied to each annular electrode with respect to a depth from the surface of a specimen, and may apply the determined voltage to the corresponding annular electrode. The optical path length from the objective lens to the light focusing position of a light flux varies in accordance with not only a depth from the surface of a specimen but also a refractive index of a specimen. The reference table may indicate a relationship between an optical path length from the objective lens to the light focusing position of a light flux and a voltage applied to each annular electrode of the phase modulation elements 11 and 12. Then, the control circuit 13 may refer to the reference table to determine a voltage applied to each annular electrode with respect to an optical path length from the objective lens to the light focusing position of a light flux, and may apply the determined voltage to the corresponding annular electrode.

In this embodiment, the total of the amount of phase modulation imparted by each of the two phase modulation elements can be increased by each phase modulation element which preliminarily displays a phase modulation profile in accordance with a predetermined ratio of the fifth-order spherical aberration component to the third-order spherical aberration component (the predetermined ratio is a ratio which is neither 0 nor ∞, i.e., has both the third-order spherical aberration component and the fifth-order spherical aberration component). When one phase modulation element displays a phase modulation profile which cancels a phase distribution of a third-order spherical aberration component and the other phase modulation element displays a phase modulation profile which cancels a phase distribution of a fifth-order spherical aberration component, the respective correction amounts relative to the third-order and fifth-order spherical aberration components are limited to the maximum value or less of the amount of phase modulation that one phase modulation element can impart. However, in this embodiment, since each of the phase modulation elements 11 and 12 can impart to a passing light flux the amount of phase modulation that corrects both the third-order spherical aberration component and the fifth-order spherical aberration component, each of the correction amounts of the third-order and fifth-order spherical aberration components is greater than the maximum value (1.8λ in this example) of the amount of phase modulation that one phase modulation element can impart.

Further, as described above, a phase difference depends on the wavelength of light to be incident on a liquid crystal layer. The laser light source 1 in a general laser microscope is operable to irradiate laser light of a selected wavelength from among a plurality of wavelengths of laser light. However, a preferable amount of phase modulation differs depending on the wavelength of laser light for use. Therefore, it is preferable for the control circuit 13 of the phase modulation device 3 to correct the amount of phase modulation which is based on each of the phase modulation elements 11 and 12. The control circuit 13 is operable to correct deviation in the amount of phase modulation due to a difference in wavelength by changing the voltage to be applied to the liquid crystal layer of the phase modulation device 3. Further, the control circuit 13 is also operable to cancel deviation in the amount of phase modulation due to a temperature difference or the like by adjusting the voltage to be applied to the liquid crystal layer of each of the phase modulation elements 11 and 12.

In the following, a method for obtaining an optimum amount of phase modulation due to a difference in wavelength of laser light is described. A graph 1300 illustrated in FIG. 13 indicates wavelength dispersion characteristics of liquid crystal provided and sealed in a liquid crystal layer of the phase modulation device 3 in the foregoing example. The horizontal axis indicates a wavelength, and the vertical axis indicates a value obtained by normalizing the phase difference (Δnd) of the phase modulation device 3 in such a manner that the value of the phase difference is equal to 1 when the wavelength is 550 nm. As represented by the graph 1300, for instance, the degree of wavelength dispersion is 1.057 when the wavelength of laser light is 488 nm, and the degree of wavelength dispersion is 1.200 when the wavelength of laser light is 405 nm. This reveals that $\Delta n (= n_e - n_o)$ differs depending on the wavelength of laser light, because the thickness d of the liquid crystal layer has a fixed value.

Therefore, even though the same position of the same specimen 5 illustrated in FIG. 1 is observed, an optimum phase modulation profile differs depending on the wavelength of the laser light source 1 for use. It is preferable to optimize a phase modulation profile by adding a degree of wavelength dispersion optimum for a target wavelength, as a parameter, to the calculation equation representing a phase modulation profile so that the phase modulation elements 11 and 12 impart the optimum phase modulation profile to a transmitting light flux.

Figure 13:
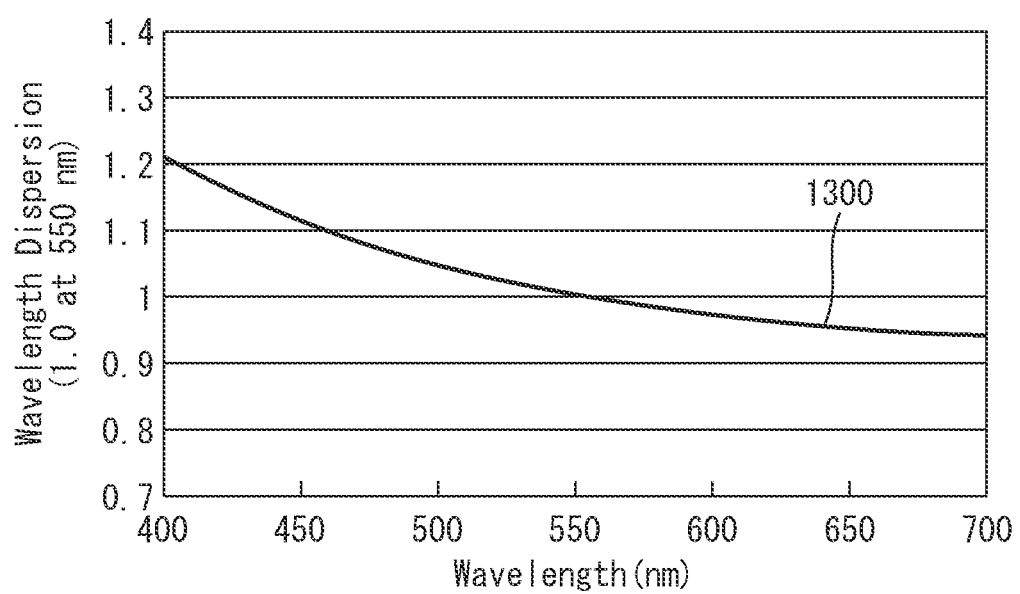
FIG. 13 is a diagram illustrating wavelength dispersion of a liquid crystal element used as a phase modulation element, with respect to laser light wavelength.

Specifically, it is preferable to use the wavelength of the laser light source 1 for use as a parameter in order to create a phase modulation profile. In other words, by multiplying a degree of wavelength dispersion as illustrated in FIG. 13 as a coefficient by the phase modulation profile created as described above, it possible to obtain an optimized phase modulation profile, taking into consideration the wavelength of laser light from the laser light source. The control circuit 13 may adjust the voltage to be applied to each of the electrodes of the phase modulation elements 11 and 12, based on the optimized phase modulation profile.

As described above, this phase modulation device has a plurality of phase modulation elements, and each phase modulation element includes a mutually different arrangement pattern of annular electrodes so as to display a phase modulation profile with a mutually different ratio of the fifth-order spherical aberration component to the third-order spherical aberration component. Accordingly, by adjusting a voltage applied to annular electrodes of each phase modulation element, this phase modulation device can successfully correct the third-order spherical aberration component and the fifth-order spherical aberration component independent of a distance from the objective lens to the light focusing position.

In a modification, a phase modulation profile displayed by each phase modulation element is not limited to one which corrects a phase distribution corresponding to a combination of the third-order spherical aberration component and the fifth-order spherical aberration component. For example, the phase modulation profile may be one which corrects a phase distribution corresponding to a combination of the total of the third-order spherical aberration component and the seventh-order spherical aberration component and the total of the fifth-order spherical aberration component and the defocus component.

Figure 14A:
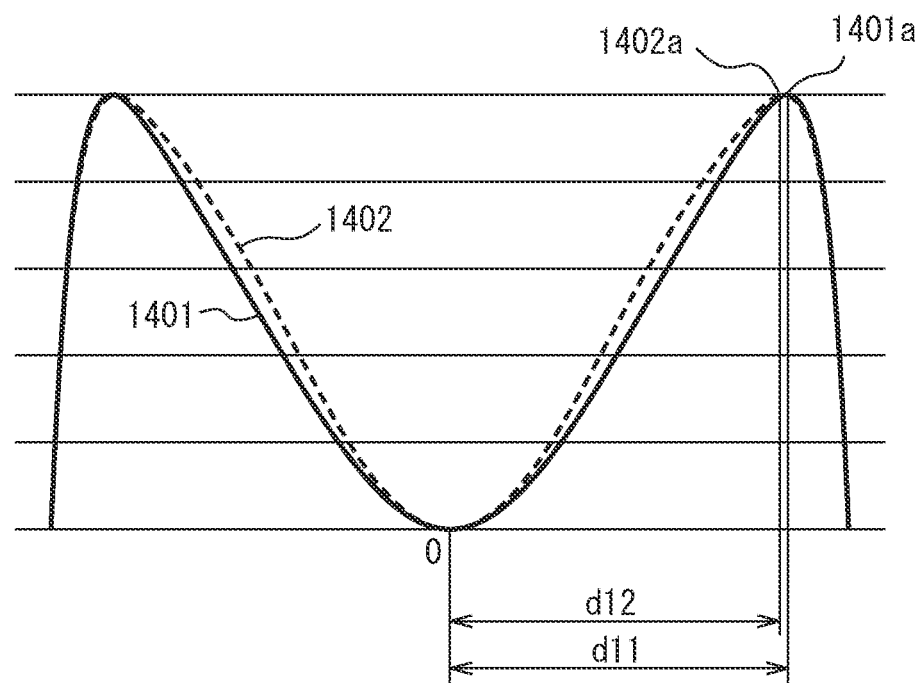
FIG. 14A is a sectional view of a phase modulation profile which is displayed on each of the two phase modulation elements and corresponds to a plane passing through the optical axis according to a modification.

FIG. 14A is a sectional view of a phase modulation profile according to a modification, which is displayed on each of the two phase modulation elements, corresponding to a plane passing through the optical axis. In this modification, the phase modulation profiles displayed by the phase modulation elements 11 and 12 correct a phase distribution corresponding to a combination of the total of the third-order spherical aberration component and the seventh-order spherical aberration component and the total of the fifth-order spherical aberration component and the defocus component. In the phase modulation profile displayed by the phase modulation element 11, the ratio of the third-order spherical aberration component, the seventh-order spherical aberration component, the fifth-order spherical aberration component, and defocus component is 1:0.084:0.292:−0.292. In the phase modulation profile displayed by the phase modulation element 12, the ratio of the third-order spherical aberration component, the seventh-order spherical aberration component, the fifth-order spherical aberration component, and defocus component is 1:0.084:0.24:−0.24.

In FIG. 14A, the horizontal axis indicates a position in a plane orthogonal to the optical axis. In the horizontal axis, the position of the optical axis is represented by 0. The vertical axis indicates the amount of phase modulation. The curve 1401 indicated by a solid line represents a phase modulation profile displayed by the phase modulation element 11. The curve 1402 indicated by a dotted line represents a phase modulation profile displayed by the phase modulation element 12. This example is such that the maximum value and the minimum value of the amount of phase modulation in the phase modulation profile 1401 coincide respectively with the maximum value and the minimum value of the amount of phase modulation in the phase modulation profile 1402.

In this modification also, as indicated by the phase modulation profiles 1401 and 1402, the positions in the phase modulation profile which are at the maximum value in the amount of phase modulation (i.e., the positions which are at the extreme value nearest the optical axis, in the amount of phase modulation) are farther away from the optical axis as the ratio of the total of the fifth-order spherical aberration component and the defocus component to the total of the third-order spherical aberration component and the seventh-order spherical aberration component increases. In other words, the distance d11 from the optical axis to the position 1401a corresponding to the extreme value nearest the optical axis in the phase modulation profile 1401 is longer than the distance d12 from the optical axis to the position 1402a corresponding to the extreme value nearest the optical axis in the phase modulation profile 1402.

Figure 14B:
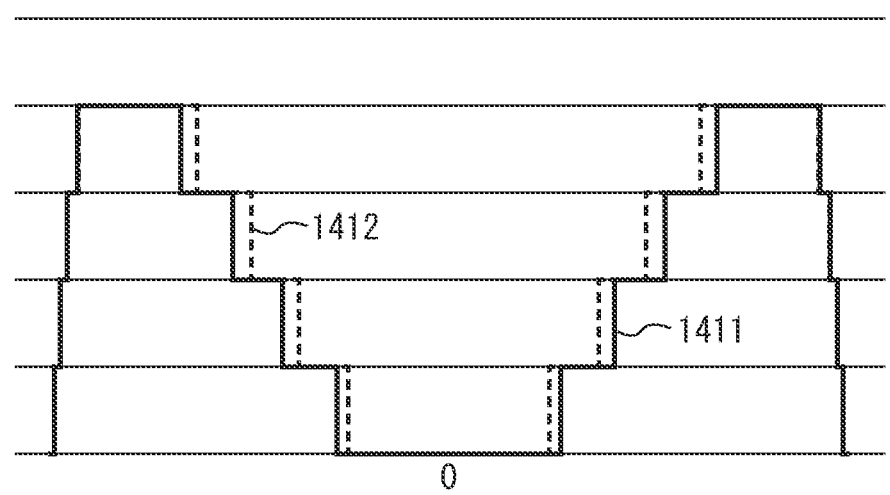
FIG. 14B depicts a sectional view of a phase modulation profile which is obtained by quantizing the phase modulation profile illustrated in FIG. 14A such that phase differences between adjacent annular bands are equidistant and corresponds to a plane passing through the optical axis.

FIG. 14B is a sectional view of a phase modulation profile corresponding to a plane passing through the optical axis, which is obtained by quantizing the phase modulation profile illustrated in FIG. 14A such that phase differences between adjacent annular bands are equidistant. In FIG. 14B, the horizontal axis indicates a position in a plane orthogonal to the optical axis. In the horizontal axis, the position of the optical axis is represented by 0. The vertical axis indicates the amount of phase modulation. The broken line 1411 indicated by a solid line represents a phase modulation profile obtained by quantizing the phase modulation profile 1401, and the broken line 1412 indicated by a dotted line represents a phase modulation profile obtained by quantizing the phase modulation profile 1402.

FIG. 15 is a view illustrating an arrangement pattern of annular electrodes of the phase modulation elements 11 and 12, which corresponds to the quantized phase modulation profiles illustrated in FIG. 14B. As depicted on the upper side, the broken line 1411 indicated by a solid line corresponds to the phase modulation profile 1411 illustrated in FIG. 14B, and the broken line 1412 indicated by a dotted line corresponds to the phase modulation profile 1412 illustrated in FIG. 14B. On the lower side of FIG. 15 are illustrated the annular electrodes pattern 1501 of the phase modulation element 11 determined according to the phase profile 1411 and the annular electrodes pattern 1502 of the phase modulation element 12 determined according to the phase profile 1412. For simplification, spaces between the annular electrodes, lead-out electrodes, or the like are not illustrated. By applying a voltage to each of the annular electrodes by the control circuit 13 in such a manner that a voltage difference between the adjacent annular electrodes corresponds to a fixed step in a voltage range, in which characteristics of the amount of phase modulation to be imparted to a light flux transmitted through the phase modulation element 11 with respect to the applied voltage is substantially linear, the phase modulation element 11 can display a quantized phase modulation profile in which the ratio of the third-order spherical aberration component, the seventh-order spherical aberration component, the fifth-order spherical aberration component, and the defocus component is 1:0.084:0.292:−0.292. Similarly, by applying a voltage to each of the annular electrodes by the control circuit 13 in such a manner that a voltage difference between the adjacent annular electrodes corresponds to a fixed step in a voltage range, in which characteristics of the amount of phase modulation to be imparted to a light flux transmitted through the phase modulation element 12 with respect to the applied voltage is substantially linear, the phase modulation element 12 can display a quantized phase modulation profile in which the ratio of the third-order spherical aberration component, the seventh-order spherical aberration component, the fifth-order spherical aberration component, and the defocus component is 1:0.084:0.24:−0.24. Thus, in this modification also, by controlling by the control circuit 13 a voltage applied to each annular electrode of each phase modulation element in accordance with a distance from the objective lens to the light focusing position, the phase modulation device can successfully correct each aberration component having a ratio according to the distance.

As described above, the position in the phase modulation profile which is at the maximum value (i.e., the extreme value nearest the optical axis) in the amount of phase modulation is farther away from the optical axis as the ratio of the total of the fifth-order spherical aberration component and the defocus component to the total of the third-order spherical aberration component and the seventh-order spherical aberration component increases. Because of this, the position corresponding to the maximum value in the amount of phase modulation imparted by the quantized phase modulation profile 1411 is also positioned farther away from the optical axis than the position corresponding to the maximum value in the amount of phase modulation imparted by the quantized phase modulation profile 1412. Accordingly, the position of the transparent electrode 1501a which corresponds to the maximum value in the amount of phase modulation imparted by the phase modulation profile in the phase modulation element 11 is farther away from the optical axis than the position of the transparent electrode 1502a which corresponds to the maximum value in the amount of phase modulation imparted by the phase modulation profile in the phase modulation element 12.

According to another modification, the number of phase modulation elements which the phase modulation device includes is not limited to two. For example, the phase modulation device may include three or more phase modulation elements which are disposed on the optical path in an optical system including an objective lens. In this case also, it is preferred that each phase modulation element displays a phase modulation profile in accordance with the ratio of any aberration component to another aberration component and that the ratio be different from one phase modulation element to another.

According to even another modification, in the phase modulation element, two transparent electrodes formed in such a manner as to be opposed with a liquid crystal layer in between may each have a plurality of annular electrodes which have an arrangement pattern corresponding to a phase modulation profile in accordance with the ratio of any aberration component to another mutually different aberration component. In this case, the number of phase modulation elements which the phase modulation device includes may be one.

Figure 16:
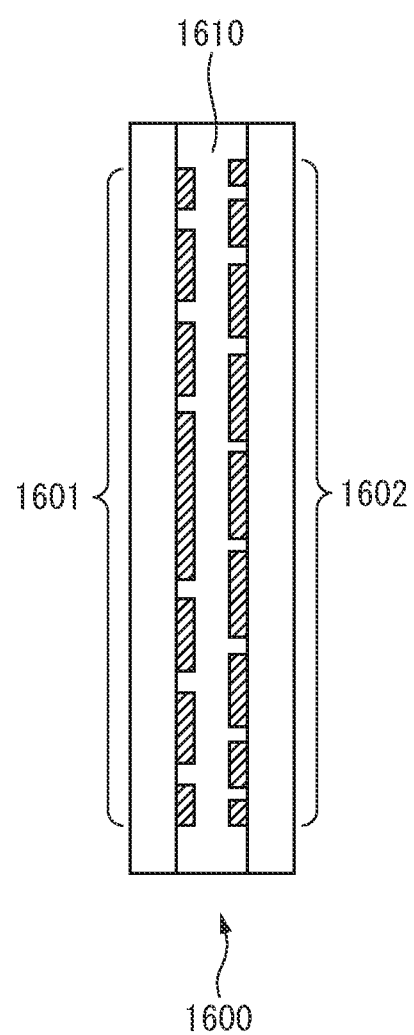
FIG. 16 schematically illustrates arrangement patterns of annular electrodes of the phase modulation element at a cross sectional plane passing through the optical axis, according to a modification.

FIG. 16 schematically illustrates arrangement patterns of annular electrodes of the phase modulation element 1600 at a cross sectional plane passing through the optical axis, according to this modification. In this modification also, the phase modulation element 1600 can be configured in the same way as the phase modulation elements 11 and 12 illustrated in FIGS. 7A and 7B except for the arrangement pattern of annular electrodes. Accordingly, for details of the configuration of the phase modulation element 1600 except for the arrangement pattern of annular electrodes, the description of the phase modulation elements 11 and 12 will be referred to. In this example, the arrangement pattern 1601 of annular electrodes provided on one surface of the liquid crystal layer 1610 of the phase modulation element 1600 is such that displays a phase modulation profile in which the ratio of the fifth-order spherical aberration component to the third-order spherical aberration component is 0.292. The arrangement pattern 1602 of annular electrodes provided on the other surface of the liquid crystal layer 1610 is such as displays a phase modulation profile in which the ratio of the fifth-order spherical aberration component to the third-order spherical aberration component is 0.24. In this case, by controlling, by the control circuit 13 in accordance with a distance from the objective lens to the light focusing position, a voltage applied to each annular electrode included in the arrangement pattern 1601 and a voltage applied to each annular electrode included in the arrangement pattern 1602, the phase modulation elements 1600 can display a phase modulation profile corresponding to the ratio of the fifth-order spherical aberration component to the third-order spherical aberration component in accordance with the distance.

In this modification, because the phase modulation element may be one, loss of light depending on the transmittance, absorptivity, and the like of the liquid crystal layer and the transparent electrode can be reduced. Further, in this modification, because the number of the phase modulation elements may be one, the space that allows the phase modulation element to be disposed therein in the light path can be small, and even a case in which a plurality of phase modulation elements are not allowed to be disposed may apply.

Further, in the embodiments and modifications described above, a liquid crystal element is used as a phase modulation element of the phase modulation device, but the phase modulation element is not limited to a liquid crystal element. For instance, an optical crystal element having an electro-optical effect as represented by a Pockels effect may be used as the phase modulation element. In this modification, as well as the case of using a liquid crystal element, annular electrodes the center of which is the optical axis are mounted on one surface of an optical crystal element on a flat plate, and an electrode is mounted on the other surface of the optical crystal element so as to cover the entirety of the surface. Similar to the embodiments described above, each of the electrodes is preferably a transparent electrode. In this modification, as well as the embodiments described above, by adjusting the voltage applied to each of the annular electrodes by the control circuit, the optical crystal element can display a phase modulation profile for correcting aberrations of an optical system including an objective lens and impart a phase distribution in accordance with the phase modulation profile to a light flux transmitted through the optical crystal element.

In another modification, a deformable mirror may be used as the phase modulation element, although the deformable mirror is disadvantageously of a reflective-type mirror. In this modification, a plurality of annular electrodes about the optical axis are mounted on the deformable mirror. By adjusting the voltage to be applied to each of the annular electrodes by the control circuit, it possible to represent a phase modulation profile that corrects aberrations of an optical system including an objective lens by the deformable mirror, and to impart a phase distribution in accordance with the phase modulation profile to a light flux reflected on the deformable mirror.

As is evident from the above description, those skilled in the art can make various modifications to the embodiments without departing from the scope and spirit of the present invention.

REFERENCE SIGNS LIST 100 laser microscope
1 laser light source
2 collimating optical system
3 phase modulation device
4 objective lens
5 specimen
6 beam splitter
7 confocal optical system
8 confocal pinhole
9 detector
11, 12, 1600 phase modulation element
13 control circuit
21, 22 transparent substrate
23 sealing member
33 transparent electrode
34 liquid crystal molecules

What is claimed is:

1. A phase modulation device for correcting a wave front aberration generated by an optical system including an objective lens disposed on an optical path of a light flux of light to be emitted from a light source, comprising:
a first phase modulation element which includes a plurality of first electrodes disposed to impart to the light flux a first amount of phase modulation to cancel a first phase distribution in accordance with a first ratio of a second aberration component of the wave front aberration to a first aberration component of the wave front aberration, and modulates a phase of the light flux in accordance with a respective first voltage applied to each of the plurality of first electrodes;
a second phase modulation element which includes a plurality of second electrodes disposed to impart to the light flux a second amount of phase modulation to cancel a second phase distribution in accordance with a second ratio of the second aberration component of the wave front aberration to the first aberration component of the wave front aberration, the second ratio being smaller than the first ratio, and modulates a phase of the light flux in accordance with a respective second voltage applied to each of the plurality of second electrodes; and
a control circuit which controls the first voltages applied to the plurality of first electrodes and the second voltages applied to the plurality of second electrodes in accordance with an optical path length from the objective lens to a light focusing position of the light flux.

2. The phase modulation device according to claim 1, wherein the first aberration component includes a third-order spherical aberration component of the wave front aberration and the second aberration component includes a fifth-order spherical aberration component of the wave front aberration.

3. The phase modulation device according to claim 1, wherein the plurality of first electrodes and the plurality of second electrodes are respectively a plurality of concentric annular electrodes about an optical axis of the optical system, and the plurality of first electrodes and the plurality of second electrodes are disposed such that a distance from the optical axis to the electrode which is the nearest to the optical axis among the electrodes which correspond to a local maximum or minimum value of the first amount of phase modulation imparted to the light flux by the first phase modulation element, among the plurality of first electrodes is greater than a distance from the optical axis to the electrode which is the nearest to the optical axis among the electrodes which correspond to a local maximum or minimum value of the second amount of phase modulation imparted to the light flux by the second phase modulation element, among the plurality of second electrodes.

4. A phase modulation device for correcting a wave front aberration generated by an optical system including an objective lens disposed on an optical path of a light flux of light to be emitted from a light source, comprising:
a phase modulation element which includes, on one surface of the phase modulation element through which the light flux is transmitted, a plurality of first electrodes disposed to impart to the light flux a first amount of phase modulation to cancel a first phase distribution in accordance with a first ratio of a second aberration component of the wave front aberration to a first aberration component of the wave front aberration; and on the other surface facing the one surface, a plurality of second electrodes disposed to impart to the light flux a second amount of phase modulation to cancel a second phase distribution in accordance with a second ratio smaller than the first ratio of the second aberration component of the wave front aberration to the first aberration component of the wave front aberration; and modulates a phase of the light flux in accordance with a respective first voltage applied to each of the plurality of first electrodes and a respective second voltage applied to each of the plurality of second electrodes; and
a control circuit which controls the first voltages applied to the plurality of first electrodes and the second voltages applied to the plurality of second electrodes in accordance with an optical path length from the objective lens to a light focusing position of the light flux.

5. A laser microscope comprising:
a coherent light source which irradiates coherent light;
a first optical system disposed on an optical path of a light flux of the coherent light which includes an objective lens to focus the light flux on a specimen;
a second optical system which transmits a light flux including specimen information derived from the specimen to a detector; and
the phase modulation device for correcting a wave front aberration generated by the first optical system;
wherein the phase modulation device includes:
a first phase modulation element disposed between the coherent light source and the objective lens, the first phase modulation element including a plurality of first electrodes disposed to impart to the light flux a first amount of phase modulation to cancel a first phase distribution in accordance with a first ratio of a second aberration component of the wave front aberration to a first aberration component of the wave front aberration, and modulating a phase of the light flux in accordance with a respective first voltage applied to each of the plurality of first electrodes;

a second phase modulation element disposed between the coherent light source and the objective lens, the second phase modulation element including a plurality of second electrodes disposed to impart to the light flux a second amount of phase modulation to cancel a second phase distribution in accordance with a second ratio of the second aberration component of the wave front aberration to the first aberration component of the wave front aberration, the second ratio being smaller than the first ratio, and modulating a phase of the light flux in accordance with a respective second voltage applied to each of the plurality of second electrodes; and a control circuit which controls the first voltages applied to the plurality of first electrodes and the second voltages applied to the plurality of second electrodes in accordance with an optical path length from the objective lens to a light focusing position of the light flux.

* * * * *